US011461688B2

(12) United States Patent
Nam et al.

(10) Patent No.: US 11,461,688 B2
(45) Date of Patent: Oct. 4, 2022

(54) SIMULTANEOUSLY ENTANGLING GATES FOR TRAPPED-ION QUANTUM COMPUTERS

(71) Applicant: IONQ, INC., College Park, MD (US)

(72) Inventors: Yunseong Nam, North Bethesda, MD (US); Reinhold Blumel, Middletown, CT (US); Nikodem Grzesiak, College Park, MD (US)

(73) Assignee: IONQ, INC., College Park, MD (US)

( * ) Notice: Subject to any disclaimer, the term of this patent is extended or adjusted under 35 U.S.C. 154(b) by 536 days.

(21) Appl. No.: 16/578,137

(22) Filed: Sep. 20, 2019

(65) Prior Publication Data

US 2020/0372389 A1 Nov. 26, 2020

Related U.S. Application Data

(60) Provisional application No. 62/851,394, filed on May 22, 2019, provisional application No. 62/851,280, filed on May 22, 2019.

(51) Int. Cl.
| | |
|---|---|
| *G06N 10/00* | (2022.01) |
| *G21K 1/00* | (2006.01) |
| *H01S 3/09* | (2006.01) |
| *B82Y 10/00* | (2011.01) |
| *H01J 49/00* | (2006.01) |
| *H04B 10/70* | (2013.01) |

(52) U.S. Cl.
CPC .............. *G06N 10/00* (2019.01); *B82Y 10/00* (2013.01); *G21K 1/003* (2013.01); *H01J 49/0072* (2013.01); *H01S 3/09* (2013.01); *H04B 10/70* (2013.01)

(58) Field of Classification Search
CPC ........ G06N 10/00; B82Y 10/00; G21K 1/003; H01J 49/0072; H01S 3/09; H04B 10/70
USPC ......................................... 359/108
See application file for complete search history.

(56) References Cited

U.S. PATENT DOCUMENTS

| 8,633,437 B2 | 1/2014 | Dantus et al. |
| 9,335,606 B2 | 5/2016 | Hanson et al. |
| (Continued) | | |

OTHER PUBLICATIONS

International Search Report dated May 28, 2020 for Application No. PCT/US2020/015234.

(Continued)

*Primary Examiner* — Tu-Tu V Ho
(74) *Attorney, Agent, or Firm* — Patterson + Sheridan LLP

(57) ABSTRACT

A method of performing simultaneous entangling gate operations in a trapped-ion quantum computer includes selecting a gate duration value and a detuning frequency of pulses to be individually applied to a plurality of participating ions in a chain of trapped ions to simultaneously entangle a plurality of pairs of ions among the plurality of participating ions by one or more predetermined values of entanglement interaction, determining amplitudes of the pulses, based on the selected gate duration value, the selected detuning frequency, and the frequencies of the motional modes of the chain of trapped ions, generating the pulses having the determined amplitudes, and applying the generated pulses to the plurality of participating ions for the selected gate duration value. Each of the trapped ions in the chain has two frequency-separated states defining a qubit, and motional modes of the chain of trapped ions each have a distinct frequency.

20 Claims, 6 Drawing Sheets

(56) References Cited

U.S. PATENT DOCUMENTS 9,858,531 B1 1/2018 Monroe et al.
2009/0213444 A1 8/2009 Goto et al.

OTHER PUBLICATIONS

Aloul, F. A., Ramani, A., Markov, I. L., Sakallah, K. A. (2002). Solving Difficult SAT Instances in the Presence of Symmetry. Proceedings of the 39th Annual Design Automation Conference, 731-736. https://doi.org/10.1145/513918.514102.

Babbush, R., Gidney, C., Berry, D. W., Wiebe, N., McClean, J., Paler, A., Fowler, A., Neven, H. (2018). Encoding Electronic Spectra in Quantum Circuits with Linear T Complexity. Physical Review X, 8(4), 041015. https://doi.org/10.1103/PhysRevX.8.041015.

Barkoutsos, P. K., Gonthier, J. F., Sokolov, I., Moll, N., Salis, G., Fuhrer, A., Ganzhom, M., Egger, D. J., Troyer, M., Mezzacapo, A., Filipp, S., Tavernelli, I. (2018). Quantum algorithms for electronic structure calculations: particle-hole Hamiltonian and optimized wavefunction expansions. Physical Review A, 98(2), 022322. https://doi.org/10.1103/PhysRevA.98.022322.

Benedetti, M., Garcia-Pintos, D., Perdomo, O., Leyton-Ortega, V., Nam, Y., Perdomo-Ortiz, A. (2019). A generative modeling approach for benchmarking and training shallow quantum circuits. Npj Quantum Information, 5, 45. https://doi.org/10.1038/s41534-019-0157-8.

Bera, D., Fenner, S., Green, F., Homer, S. (2008). Universal Quantum Circuits. ArXiv:0804.2429 [Cs.CC].

Blumel, R., Grzesiak, N., Nam, Y. (2019). Power-optimal, stabilized entangling gate between trapped-ion qubits. ArXiV:1905.09292 [Quant-Ph].

Bravyi, S., Gambetta, J. M., Mezzacapo, A., Temme, K. (2017). Tapering off qubits to simulate fermionic Hamiltonians. ArXiv:1701.08213 [Quant-Ph].

Bravyi, S., Haah, J. (2012). Magic-state distillation with low overhead. Physical Review A, 86(5), 052329. https://doi.org/10.1103/PhysRevA.86.052329.

Childs, A. M., Maslov, D., Nam, Y., Ross, N. J., Su, Y. (2018). Toward the first quantum simulation with quantum speedup. Proceedings of the National Academy of Sciences of the United States of America, 115(38), 9456-9461. https://doi.org/10.1073/pnas.1801723115.

Chow, J. M. (2010). Quantum Information Processing with Superconducting Qubits. Yale University.

Crooks, G. E. (2018). Performance of the Quantum Approximate Optimization Algorithm on the Maximum Cut Problem. ArXiv:1811.08419 [Quant-Ph].

Dumitrescu, E. F., McCaskey, A. J., Hagen, G., Jansen, G. R., Morris, T. D., Papenbrock, T., Pooser, R. C., Dean, D. J., Lougovski, P. (2018). Cloud Quantum Computing of an Atomic Nucleus. Physical Review Letters, 120(21), 210501. https://doi.org/10.1103/PhysRevLett.120.210501.

Endo, S., Benjamin, S. C., Li, Y. (2018). Practical Quantum Error Mitigation for Near-Future Applications. Physical Review X, 8(3), 031027. https://doi.org/10.1103/PhysRevX.8.031027.

Endo, S., Jones, T., McArdle, S., Yuan, X., Benjamin, S. (2019). Variational quantum algorithms for discovering Hamiltonian spectra. Physical Review A, 99(6), 062304. https://doi.org/10.1103/PhysRevA.99.062304.

Evenbly, G., Vidal, G. (2007). Algorithms for entanglement renormalization. Physical Review B, 79(14), 144108. https://doi.org/10.1103/PhysRevB.79.144108.

Farhi, E., Goldstone, J., Gutmann, S. (2014). A Quantum Approximate Optimization Algorithm. ArXiv:1411.4028 [Quant-Ph].

Green, T. J., Biercuk, M. J. (2015). Phase-modulated decoupling and error suppression in qubit-oscillator systems. Physical Review Letters, 114(12), 120502. https://doi.org/10.1103/PhysRevLett.114.120502.

H Weinstein, B. D. (1934). Modified Ritz Method. Proceedings of the National Academy of Sciences, 20, 529-532.

Hadfield, S., Papageorgiou, A. (2018). Divide and conquer approach to quantum Hamiltonian simulation. New Journal of Physics, 20(4), 043003. https://doi.org/10.1088/1367-2630/aab1ef.

Harrow, A. W., Hassidim, A., Lloyd, S. (2009). Quantum algorithm for linear systems of equations. Physical Review Letters, 103(15), 150502. https://doi.org/10.1103/PhysRevLett.103.150502.

Hempel, C., Maier, C., Romero, J., McClean, J., Monz, T., Shen, H., Jurcevic, P., Lanyon, B., Love, P., Babbush, R., Aspuru-Guzik, A., Blatt, R., Roos, C. (2018). Quantum chemistry calculations on a trapped-ion quantum simulator. Physical Review X, 8(3), 031022. https://doi.org/10.1103/PhysRevX.8.031022.

Higgott, O., Wang, D., Brierley, S. (2019). Variational Quantum Computation of Excited States. Quantum, 156. https://doi.org/10.22331/q-2019-07-01-156.

Jones, N. C., Whitfield, J. D., McMahon, P. L., Yung, M. H., Meter, R. Van, Aspuru-Guzik, A., Yamamoto, Y. (2012). Faster quantum chemistry simulation on fault-tolerant quantum computers. New Journal of Physics, 14, 115023. https://doi.org/10.1088/1367-2630/14/11/115023.

Kandala, A., Mezzacapo, A., Temme, K., Takita, M., Brink, M., Chow, J. M., Gambetta, J. M. (2017). Hardware-efficient Variational Quantum Eigensolver for Small Molecules and Quantum Magnets. Nature, 549, 242-246. https://doi.org/10.1038/nature23879.

Kassal, I., Jordan, S. P., Love, P. J., Mohseni, M., Aspuru-Guzik, A. (2008). Polynomial-time quantum algorithm for the simulation of chemical dynamics. Proceedings of the National Academy of Sciences of the United States of America, 105(48), 18681-18686. https://doi.org/10.1073/pnas.0808245105.

Kim, I. H. (2017). Noise-resilient preparation of quantum many-body ground states. ArXiv:1703.00032 [Quant-Ph].

Kim, I. H., Swingle, B. (2017). Robust entanglement renormalization on a noisy quantum computer. ArXiv:1711.07500 [Quant-Ph].

Klco, N., Dumitrescu, E. F., McCaskey, A. J., Morris, T. D., Pooser, R. C., Sanz, M., Solano, E., Lougovski, P., Savage, M. J. (2018). Quantum-Classical Computation of Schwinger Model Dynamics using Quantum Computers. Physical Review A, 98(3), 032331. https://doi.org/10.1103/PhysRevA.98.032331.

Landsman, K. A., Figgatt, C., Schuster, T., Linke, N. M., Yoshida, B., Yao, N. Y., Monroe, C. (2019). Verified Quantum Information Scrambling. Nature, 567(7746), 61-65. https://doi.org/10.1038/s41586-019-0952-6.

Liu, J.-G., Zhang, Y.-H., Wan, Y., Wang, L. (2019). Variational quantum eigensolver with fewer qubits. Physical Review Research, 1(2), 023025. https://doi.org/10.1103/physrevresearch.1.023025.

Lloyd, S., Mohseni, M., Rebentrost, P. (2014). Quantum principal component analysis. Nature Physics, 10(9), 631-633. https://doi.org/10.1038/NPHYS3029.

MacDonald, J. K. L. (1934). On the Modified Ritz Variation Method. Physical Review, 46(9), 828. https://doi.org/10.1103/PhysRev.46.828.

Marquet, C., Schmidt-Kaler, F., James, D. F. V. (2003). Phonon-phonon interactions due to non-linear effects in a linear ion trap. Applied Physics B, 76(3), 199-208. https://doi.org/10.1007/s00340-003-1097-7.

Maslov, D. (2017). Basic circuit compilation techniques for an ion-trap quantum machine. New Journal of Physics, 19(2), 023035. https://doi.org/10.1088/1367-2630/aa5e47.

Maslov, D. (2016). Advantages of using relative-phase Toffoli gates with an application to multiple control Toffoli optimization. Physical Review A, 93(2), 022311. https://doi.org/10.1103/PhysRevA.93.022311.

McArdle, S., Endo, S., Aspuru-Guzik, A., Benjamin, S., Yuan, X. (2020). Quantum computational chemistry. Reviews of Modern Physics, 92(1), 015003. https://doi.org/10.1103/RevModPhys.92.015003.

McArdle, S., Yuan, X., Benjamin, S. (2019). Error-mitigated digital quantum simulation. Physical Review Letters, 122(18), 180501. https://doi.org/10.1103/PhysRevLett.122.180501.

McClean, J. R., Boixo, S., Smelyanskiy, V. N., Babbush, R., Neven, H. (2018). Barren plateaus in quantum neural network training landscapes. Nature Communications, 9, 4812. https://doi.org/10.1038/s41467-018-07090-4.

(56) References Cited

OTHER PUBLICATIONS

McClean, J. R., Romero, J., Babbush, R., Aspuru-Guzik, A. (2016). The theory of variational hybrid quantum-classical algorithms. New Journal of Physics, 18(2), 023023. https://doi.org/10.1088/1367-2630/18/2/023023.

McClean, J. R., Schwartz, M. E., Carter, J., de Jong, W. A. (2017). Hybrid Quantum-Classical Hierarchy for Mitigation of Decoherence and Determination of Excited States. Physical Review A, 95(4), 042308. https://doi.org/10.1103/PhysRevA.95.042308.

Merrill, J. T., Brown, K. R. (2014). Progress in compensating pulse sequences for quantum computation. In Sabre Kais (Ed.), Quantum Information and Computation for Chemistry (pp. 241-294). John Wiley Sons. https://doi.org/10.1002/9781118742631.ch10.

Nam, Y., Su, Y., Maslov, D. (2020). Approximate quantum Fourier transform with O(n log(n)) T gates. Npj Quantum Information, 6, 26. https://doi.org/10.1038/s41534-020-0257-5.

Nielsen, M. A., Chuang, I. L. (2010). Quantum computation and quantum information. Cambridge University Press. https://doi.org/10.1017/CBO9780511976667.

O'Gorman, J., Campbell, E. T. (2017). Quantum computation with realistic magic-state factories. Physical Review A, 95(3), 032338. https://doi.org/10.1103/PhysRevA.95.032338.

O'Malley, P. J. J., Babbush, R., Kivlichan, I. D., Romero, J., McClean, J. R., Barends, R., Kelly, J., Roushan, P., Tranter, A., Ding, N., Campbell, B., Chen, Y., Chen, Z., Chiaro, B., Dunsworth, A., Fowler, A. G., Jeffrey, E., Megrant, A., Mutus, J. Y., Martinis, J. M. (2016). Scalable Quantum Simulation of Molecular Energies. Physical Review X, 6(3), 031007. https://doi.org/10.1103/PhysRevX.6.031007.

Orus, R., Mugel, S., Lizaso, E. (2019). Quantum computing for finance: overview and prospects. Reviews in Physics, 4, 100028. https://doi.org/10.1016/j.revip.2019.100028.

Preskill, J. (2018). Quantum Computing in the NISQ era and beyond. Quantum, 2, 79. https://doi.org/10.22331/q-2018-8-06-79.

Reiher, M., Wiebe, N., Svore, K. M., Wecker, D., Troyer, M. (2017). Elucidating reaction mechanisms on quantum computers. Proceedings of the National Academy of Sciences of the United States of America, 114(29), 7555-7560. https://doi.org/10.1073/pnas.1619152114.

Richardson, L., Gaunt, J. A. (1927). The deferred approach to the limit. Phil. Trans. R. Soc. Lond. A, 226(636-646), 299-361. https://doi.org/10.1098/rsta.1927.0008.

Seeley, J. T., Richard, M. J., Love, P. J. (2012). The Bravyi-Kitaev transformation for quantum computation of electronic structure. Journal of Chemical Physics, 137(22), 224109. https://doi.org/10.1063/1.4768229.

Shantanu, D. (2016). A Programmable Five Qubit Quantum Computer Using Trapped Atomic Ions. University of Maryland Department of Physics and National Institute of Standards and Technology.

Shen, Y., Zhang, X., Zhang, S., Zhang, J. N., Yung, M. H., Kim, K. (2017). Quantum implementation of the unitary coupled cluster for simulating molecular electronic structure. Physical Review A, 95(2). https://doi.org/10.1103/PhysRevA.95.020501.

Takeshita, T., Rubin, N. C., Jiang, Z., Lee, E., Babbush, R., McClean, J. R. (2020). Increasing the representation accuracy of quantum simulations of chemistry without extra quantum resources. Physical Review X, 10(1), 011004. https://doi.org/10.1103/PhysRevX.10.011004.

Toloui, B., Love, P. J. (2013). Quantum Algorithms for Quantum Chemistry based on the sparsity of the CI-matrix. ArXiv:1312.2579 [Quant-Ph].

Tranter, A., Sofia, S., Seeley, J., Kaicher, M., McClean, J., Babbush, R., Coveney, P. V., Mintert, F., Wilhelm, F., Love, P. J. (2015). The Bravyi-Kitaev transformation: Properties and applications. International Journal of Quantum Chemistry, 115(19), 1431-1441. https://doi.org/10.1002/qua.24969.

Ward, N. J., Kassal, I., Aspuru-Guzik, A. (2009). Preparation of many-body states for quantum simulation. Journal of Chemical Physics, 130(19), 194105. https://doi.org/10.1063/1.3115177.

Wecker, D., Bauer, B., Clark, B. K., Hastings, M. B., Troyer, M. (2014). Gate count estimates for performing quantum chemistry on small quantum computers. Physical Review A, 90(2), 022305. https://doi.org/10.1103/PhysRevA.90.022305.

Welch, J., Greenbaum, D., Mostame, S., Aspuru-Guzik, A. (2014). Efficient quantum circuits for diagonal unitaries without ancillas. New Journal of Physics, 16, 033040. https://doi.org/10.1088/1367-2630/16/3/033040.

Whitfield, J. D., Biamonte, J., Aspuru-Guzik, A. (2011). Simulation of electronic structure Hamiltonians using quantum computers. Molecular Physics, 109(5), 735-750. https://doi.org/10.1080/00268976.2011.552441.

Wineland, D. J., Monroe, C., Itano, W. M., Leibfried, D., King, B. E., Meekhof, D. M. (1998). Experimental Issues in Coherent Quantum-State Manipulation of Trapped Atomic Ions. Journal of Research of the National Institute of Standards and Technology, 103(3), 259. https://doi.org/10.6028/jres.103.019.

Zhu, S.-L., Monroe, C., Duan, L.-M. (2006). Trapped ion quantum computation with transverse phonon modes. Physical Review Letters, 97(5), 050505. https://doi.org/10.1103/PhysRevLett.97.050505.

Bravyi, S. B., Landau, L. D., Kitaev, A. Y. (2002). Fermionic quantum computation. Annals of Physics, 298(1), 210-226. https://doi.org/10.1006/aphy.2002.6254.

Aspuru-Guzik. Alan, Dutoi. Anthony D., Love, P. J., Head-Gordon, M. (2005). Simulated Quantum Computation of Molecular Energies. Science, 309(5741), 1704-1707. https://doi.org/10.1126/science.1113479.

Shehab, O., Landsman, K. A., Nam, Y., Zhu, D., Linke, N. M., Keesan, M. J., Pooser, R. C., Monroe, C. R. (2019). Toward convergence of effective field theory simulations on digital quantum computers. Physical Review A, 100(6), 062319. https://doi.org/10.1103/PhysRevA.100.062319.

Lu, D., Xu, N., Xu, R., Chen, H., Gong, J., Peng, X., Du, J. (2011). Simulation of chemical isomerization reaction dynamics on a NMR quantum simulator. Physical Review Letters, 107(2), 020501. https://doi.org/10.1103/PhysRevLett.107.020501.

Kitaev, A. Y., Landau, L. D. (1995). Quantum measurements and the Abelian Stabilizer Problem. ArXiv:Quant-Ph/9511026.

Hewitt, E., Hewitt, R. E. (1979). The Gibbs-Wilbraham Phenomenon: An Episode in Fourier Analysis. Archive for History of Exact Sciences, 21, 129-160. https://doi.org/10.1007/BF00330404.

Goemans, E. X., Williamson, D. P., Williamson, D. P., Goemans, M. X. (1994). Improved Approximation Algorithms for Maximum Cut and Satisfiability Problems Using Semidefinite Programming. Journal of the Association for Computing Machinery, 42(6), 1115-1145. https://doi.org/10.1145/227683.227684.

Santagati, R., Wang, J., Gentile, A. A., Paesani, S., Wiebe, N., Mcclean, J. R., Morley-Short, S., Shadbolt, P. J., Bonneau, D., Silverstone, J. W., Tew, D. P., Zhou, X., O'brien, J. L., Thompson, M. G. (2018). Witnessing eigenstates for quantum simulation of Hamiltonian spectra. Science Advances, 4(1), eaap9646. https://doi.org/10.1126/sciadv.aap9646.

Moll, N., Fuhrer, A., Staar, P., Tavernelli, I. (2016). Optimizing qubit resources for quantum chemistry simulations in second quantization on a quantum computer. Journal of Physics A: Mathematical and Theoretical, 49(29), 295301. https://doi.org/10.1088/1751-8113/49/29/295301.

Jordan, V. P., Wigner in GSttingen, E. (1928). Uber das Paulische Aquivalenzverbot. Zeitschrift Fur Physik, 47, 631-651. https://doi.org/01007/BF01331938.

Cormen, T. H., Leiserson, C. E., Rivest, R. L., Clifford Stein. (2009). Introduction to algorithms. MIT press.

Colless, J. I., Ramasesh, V. V., Dahlen, D., Blok, M. S., Kimchi-Schwartz, M. E., McClean, J. R., Carter, J., De Jong, W. A., Siddiqi, I. (2018). Computation of Molecular Spectra on a Quantum Processor with an Error-Resilient Algorithm. Physical Review X, 8(1), 011021. https://doi.org/10.1103/PhysRevX.8.011021.

Dobšiček, M., Johansson, G., Shumeiko, V., Wendin, G. (2007). Arbitrary accuracy iterative phase estimation algorithm as a two qubit benchmark Physical Review A, 76(3), 030306. https://doi.org/10.1103/PhysRevA.76.030306.

(56) References Cited

OTHER PUBLICATIONS

Peruzzo, A., McClean, J., Shadbolt, P., Yung, M. H., Zhou, X. Q., Love, P. J., Aspuru-Guzik, A., O'Brien, J. L. (2014). A variational eigenvalue solver on a photonic quantum processor. Nature Communications, 5, 4213. https://doi.org/10.1038/ncomms5213.

P. W Shor, Polynomial-time algorithms for prime factorization and discrete logarithms on a quantum computer. SIAM Rev. 41, 303(332 (1999).

L. K. Grover, Quantum mechanics helps in searching for a needle in a haystack. Phys. Rev. Lett. 79, 325(328 (1997).

R. P. Feynman, Simulating physics with computers. Int. J. Theor. Phys. 21, 467-488 (1982).

Y. Wang, M. Um, J. Zhang, S. An, M. Lyu, J.-N. Zhang, L.-M. Duan, D. Yum, K. Kim, Single-qubit quantum memory exceeding ten-minute coherence time. Nat. Photonics 11, 646(650 (2017).

T. P. Harty, D. T. C. Allcock, C. J. Ballance, L. Guidoni, H. A. Janacek, N. M. Linke, D. N. Stacey, D. M. Lucas, High-fidelity preparation, gates, memory, and readout of a trapped-ion quantum bit. Phys. Rev. Lett. 113, 220501 (2014).

J. P. Gaebler, T. R. Tan, Y. Lin, Y. Wan, R. Bowler, A. C. Keith, S. Glancy, K. Coakley, E. Knill, D. Leibfried, D. J. Wineland, High-Fidelity universal gate set for 9Be+ion qubits. Phys. Rev. Lett. 117, 060505 (2016).

C. J. Ballance, T. P. Harty, N. M. Linke, M. A. Sepiol, D. M. Lucas, High-fidelity quantum logic gates using trapped-ion hyperfne qubits. Phys. Rev. Lett. 117,060504 (2016).

N. M. Linke, D. Maslov, M. Roetteler, S. Debnath, C. Figgatt, K. A. Landsman, K. Wright, C. Monroe, Experimental comparison of two quantum computing architectures. Proc. Natl. Acad. Sci. U.S.A. 114, 3305-3310 (2017).

D. Maslov, Y. S. Nam, J. Kim, An outlook for quantum computing. Proc. IEEE, 107, 5-10 (2019).

Y. Nam, D. Maslov, Low cost quantum circuits for classically intractable instances of the Hamiltonian dynamics simulation problem. https://arxiv.org/abs/1805.04645 (2018).

K. Wright et al., Benchmarking an 11-qubit quantum computer. https://arxiv.org/abs/1903.08181 (2019).

K. Molmer, A. S rensen, Multiparticle entanglement of hot trapped ions. Phys. Rev. Lett. 82, 1835-1838 (1999).

A. Sorensen, K. Molmer, Quantum computation with ions in thermal motion. Phys. Rev. Lett. 82, 1971-1974 (1999).

T. Choi, S. Debnath, T. A. Manning, C. Figgatt, Z.-X. Gong, L.-M. Duan, C. Monroe, Optimal quantum control of multimode couplings between trapped ion qubits for scalable entanglement. Phys. Rev. Lett. 112, 190502 (2014).

S.-L. Zhu, C. Monroe, L.-M. Duan, Arbitrary-speed quantum gates within large ion crystals through minimum control of laser beams. Europhys. Lett. 73, 485-491 (2006).

S. Boyd, L. Vandenberghe, Convex Optimization (Cambridge Press, New York, NY, 2004).

C. Figgatt, A. Ostrander, N. M. Linke, K. A. Landsman, D. Zhu, D. Maslov, C. Monroe, Parallel entangling operations on a universal ion trap quantum computer. https://arxiv.org/abs/1810.11948 (2018).

Y. Lu, S. Zhang, K. Zhang, W. Chen, Y. Shen, J. Zhang, J.-N. Zhang, K. Kim, Scalable global entangling gates on arbitrary ion qubits. https://arxiv.org/abs/1901.03508 (2019).

S. Beauregard, Circuit for Shors algorithm using 2n + 3 qubits. Quant. Inf. Comp. 3, 175-185 (2003).

T. G. Draper, S. A. Kutin, E. M. Rains, K. M. Svore, A logarithmic-depth quantum carry-lookahead adder. Quant. Inf. Comp. 6, 351-369 (2006).

D. Maslov, Y. Nam, Use of global interactions in efficient quantum circuit constructions. New J. Phys. 20, 033018 (2018).

E. Bernstein, U. Vazirani, Quantum complexity theory SIAM J. Comput. 26, 1411-1473 (1997).

Y. Nam et al., Ground-state energy estimation of the water molecule on a trapped ion quantum computer. https://arxiv.org/abs/1902.10171 (2019).

W. van Dam, S. Hallgren, L. Ip, Quantum algorithms for some hidden shift problems. SIAM J. Comput. 36, 763-778 (2006).

F. A. Calderon-Vargas, G. S. Barron, X.-H. Deng, A. J. Sigillito, E. Barnes, S. E. Economou, Fast high-fidelity entangling gates in Si double quantum dots. https://arxiv.org/abs/1902.02350 (2019).

L. S. Theis, F. Motzoi, F. K. Wilhelm, M. Saman, High-fidelity Rydberg-blockade entangling gate using shaped, analytic pulses. Phys. Rev. A 94, 032306 (2016).

M. M. Muller, H. R. Haakh, T. Calarco, C. P. Koch, C. Henkel, Prospects for fast Rydberg gates on an atom chip. Ouant. Inf. Process. 10, 771792 (2011).

J. M. Gambetta, F. Motzoi, S. T. Merkel, F. K. Wilhelm, Analytic control methods for high-fidelity unitary operations in a weakly nonlinear oscillator. Phys. Rev. A 83, 012308 (2011).

A. Sport, T. Schulte-Herbruggen, S. J. Glaser, V. Bergholm, M. J. Storcz, J. Ferber, F. K. Wilhelm, Optimal control of coupled Josephson qubits. Phys. Rev. A75, 012302 (2007).

G. M. Amdahl, Validity of the single processor approach to achieving large scale computing capabilities. AFIPS Conf. Proc. 30, 483(485 (1967).

S. Debnath, N. M. Linke, C. Figgatt, K. A. Landsman, K. Wright, C. Monroe, Demonstration of a small programmable quantum computer with atomic qubits. Nature 536, 63(66 (2016).

P. H. Leung, K. A. Landsman, C. Figgatt, N. M. Linke, C. Monroe, K. R. Brown, Robust 2-qubit gates in a linear ion crystal using a frequency-modulated driving force. Phys. Rev. Lett. 120, 020501 (2018).

V. V. Shende, I. L. Markov, S. S. Bullock, Minimal universal two-qubit controlled-NOT-based circuits. Phys. Rev. A 69, 062321 (2004).

G.-D. Lin et al., "Large-scale quantum computation in an anharmonic linear ion trap," Europhysics Letters, vol. 86, No. 6 (Jul. 9, 2009), 60004 (5 pages).

Yukai Wu et al., "Noise Analysis for High-Fidelity Quantum Entangling Gates in an Anharmonic Linear Paul Trap", Physical Review A, vol. 97(Jun. 19, 2018), 062325 (16 pages).

T. Choi et al., "Optimal Quantum Control of Multimode Couplings between Trapped Ion Qubits for Scalable Entanglement," Physical Review Letters, vol. 112 (May 16, 2014), 190502 (5 pages).

Farhang Haddadfarshi et al. "High Fidelity Quantum Gates of Trapped Ions in the Presence of Motional Heating", New Journal of Physics, vol. 18, No. 12, Dec. 2, 2016, p. 123007, XP055722925.

International Search Report dated Sep. 4, 2020 for Application No. PCT/US2020/034008.

C. Figgatt, et al, "Parallel Entangling Operations on a Universal Ion Trap Quantum Computer," arXiv:1810.11948 [quant-ph] (Oct. 29, 2018).

Nikodem Grzesiak et al, "Efficient Arbitrary Simultaneously Entangling Gates on a trapped-ion quantum computer," arXiv:1905.09294 [quant-ph] (May 22, 2019).

Caroline Margaret Figgatt: "Building and Programming a Universal Ion Trap Quantum Computer," Dissertation submitted to the Faculty of the Graduate School of the University of Maryland, College Park (Jul. 17, 2018).

A. E. Webb et al: "Resilient entanglement gates for trapped ions," arXiv:1805.07351 [quant-ph] (May 18, 2018).

International Search Report dated May 28, 2020 for Application No. PCT/US2020/015235.

SIMULTANEOUSLY ENTANGLING GATES FOR TRAPPED-ION QUANTUM COMPUTERS

CROSS-REFERENCE TO RELATED APPLICATIONS

This application claims the benefit to U.S. Provisional Application No. 62/851,394, filed May 22, 2019, and the benefit to U.S. Provisional Application No. 62/851,280, filed May 22, 2019, which are both incorporated by reference herein.

BACKGROUND

Field

The present disclosure generally relates to a method of performing entangling gate operations in an ion trap quantum computer, and more specifically, to a method of constructing pulses to simultaneously perform multiple entangling gate operations.

Description of the Related Art

In quantum computing, quantum bits or qubits, which are analogous to bits representing a "0" and a "1" in a classical (digital) computer, are required to be prepared, manipulated, and measured (read-out) with near perfect control during a computation process. Imperfect control of the qubits leads to errors that can accumulate over the computation process, limiting the size of a quantum computer that can perform reliable computations.

Among physical systems upon which it is proposed to build large-scale quantum computers, is a chain of ions (e.g., charged atoms), which are trapped and suspended in vacuum by electromagnetic fields. The ions have internal hyperfine states which are separated by frequencies in the several GHz range and can be used as the computational states of a qubit (referred to as "qubit states"). These hyperfine states can be controlled using radiation provided from a laser, or sometimes referred to herein as the interaction with laser beams. The ions can be cooled to near their motional ground states using such laser interactions. The ions can also be optically pumped to one of the two hyperfine states with high accuracy (preparation of qubits), manipulated between the two hyperfine states (single-qubit gate operations) by laser beams, and their internal hyperfine states detected by fluorescence upon application of a resonant laser beam (read-out of qubits). A pair of ions can be controllably entangled (two-qubit gate operations) by qubit-state dependent force using laser pulses that couple the ions to the collective motional modes of a chain of trapped ions, which arise from their Coulombic interaction between the ions. In general, entanglement occurs when pairs or groups of ions (or particles) are generated, interact, or share spatial proximity in ways such that the quantum state of each ion cannot be described independently of the quantum state of the others, even when the ions are separated by a large distance. As the size of a quantum computer increases, implementation of two-qubit gate operations between a pair of ions increases complexity, and thus errors associated with the implementation and resources, such as laser powers, required for the implementation increase.

To increase the size of a quantum computer that may be able to implement algorithms to solve problems otherwise intractable in classical computer, there is a need for a procedure to accurately control qubits to perform a desired computation process with minimum resources.

SUMMARY

A method of performing simultaneous entangling gate operations in a trapped-ion quantum computer includes selecting a gate duration value and a detuning frequency of pulses to be individually applied to a plurality of participating ions in a chain of trapped ions to simultaneously entangle a plurality of pairs of ions among the plurality of participating ions by one or more predetermined values of entanglement interaction, determining amplitudes of the pulses, based on the selected gate duration value, the selected detuning frequency, and the frequencies of the motional modes of the chain of trapped ions, generating the pulses having the determined amplitudes, and applying the generated pulses to the plurality of participating ions for the selected gate duration value. Each of the trapped ions in the chain has two frequency-separated states defining a qubit, and motional modes of the chain of trapped ions each have a distinct frequency.

A method of performing a computation using a quantum computer includes executing, by a processor in a digital computer, a software program that is stored in non-volatile memory of the digital computer, and generating a solution to the selected quantum algorithm based on the processed results of the quantum computations. The executed software program requires at least one computation to be performed, and performing the at least one computation includes selecting, by the processor in the digital computer, a quantum algorithm to be implemented on a quantum computer, wherein the quantum computer comprises a chain of trapped ions disposed within a quantum register of the quantum computer, the trapped ions in the chain each have two frequency-separated states that each define a qubit, and motional modes of the chain of trapped ions each have a distinct frequency, compiling the selected quantum algorithm into a series of universal logic gates, translating the series of universal logic gates into laser pulses to apply to a plurality of participating ions within the quantum register, calculating, by the processor in the digital computer, parameters of the laser pulses that are to be applied to the plurality of participating ions within the quantum register during a process of performing the at least one computation, generating laser pulses each having the determined amplitudes, performing quantum computations by applying the generated laser pulses to the plurality of participating ions over a length of time equal to the gate duration value, determining results of the quantum computations by measuring a population of qubit states of the trapped ions in the chain, and processing the determined results of the quantum computations by the processor of the digital computer based on the measured population of the qubit states. Calculating the parameters includes determining, by the processor in the digital computer, amplitudes of the laser pulses based on information stored in the digital computer regarding a gate duration value and frequencies of the motional modes of the chain of trapped ions.

A quantum computing system includes a chain of trapped ions, each of the trapped ions having two hyperfine states defining a qubit and an excited state, one or more lasers configured to emit a laser beam that is split into two or more non-copropagating laser beams which are provided to each of the trapped ions, and a controller configured to select a gate duration value and a detuning frequency of pulses to be individually applied to a plurality of participating ions in a chain of trapped ions to simultaneously entangle a plurality of pairs of ions among the plurality of participating ions by one or more predetermined values of entanglement interaction, determine amplitudes of the pulses, based on the selected gate duration value, the selected detuning frequency, and the frequencies of the motional modes of the chain of trapped ions, wherein the amplitudes are derived based on conditions for non-zero entanglement interaction between each of the plurality of pairs of ions that are to be entangled, decoupling between each pair of ions that are not to be entangled, and minimized power provided to the plurality of participating ions during the selected gate duration value, generate the pulse comprising the determined amplitude and the detuning frequency, and apply the generated pulse to the first and second ions for the gate duration value. Each of the trapped ions has two frequency-separated states defining a qubit, motional modes of the chain of trapped ions each have a distinct frequency, and one of the plurality of pairs of ions comprises the first ion and the second ion. The two or more non-copropagating laser beams are configured to cause Rabi flopping of each of the trapped ions between the two hyperfine states via the excited state.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

Figure 1:
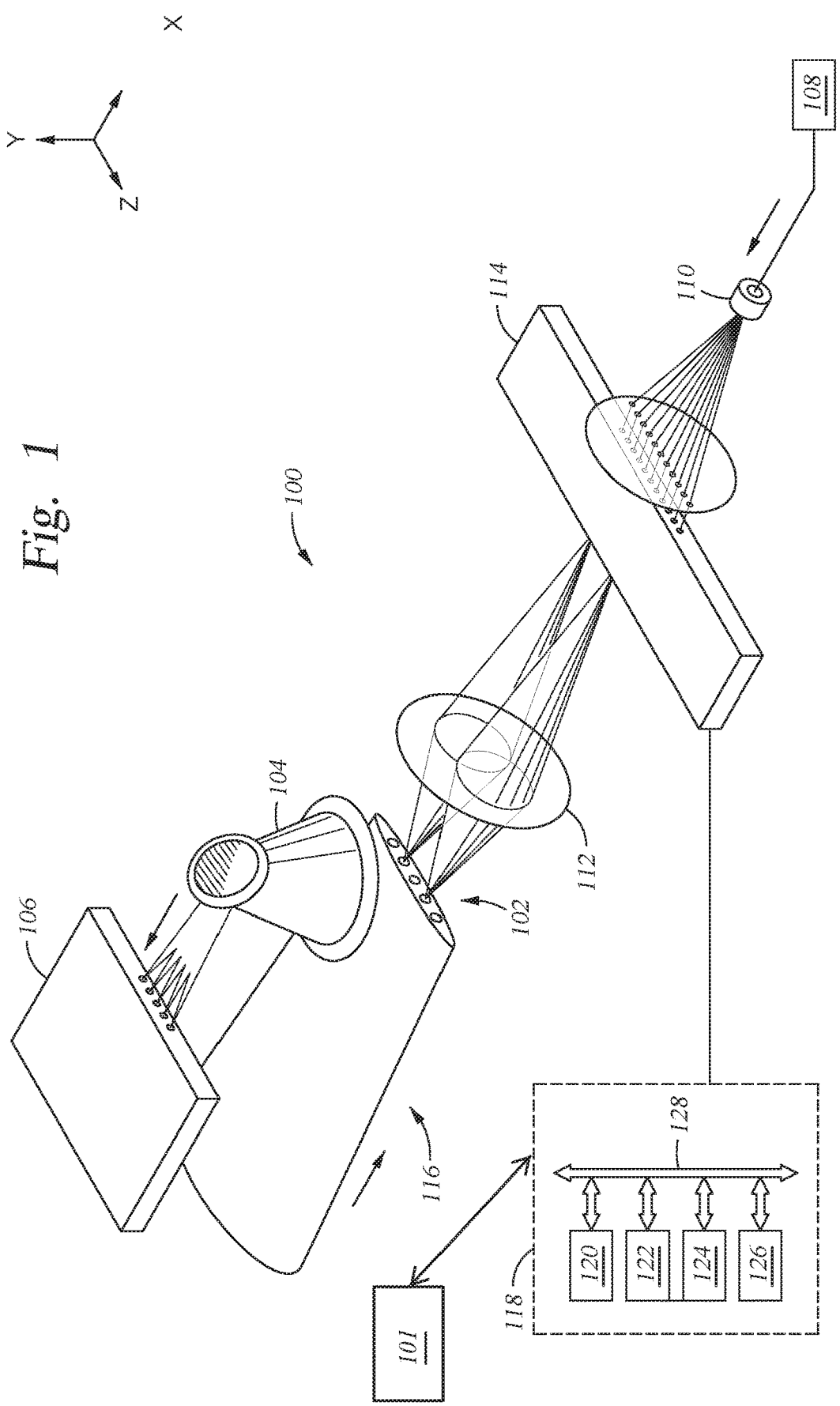
FIG. 1 is a partial view of an ion trap quantum computer according to one embodiment.

To facilitate understanding, identical reference numerals have been used, where possible, to designate identical elements that are common to the figures. In the figures and the following description, an orthogonal coordinate system including an X-axis, a Y-axis, and a Z-axis is used. The directions represented by the arrows in the drawing are assumed to be positive directions for convenience. It is contemplated that elements disclosed in some embodiments may be beneficially utilized on other implementations without specific recitation.

DETAILED DESCRIPTION

Embodiments described herein are generally related to a method and a system for designing, optimizing, and delivering pulses to simultaneously perform entangling gate operations on multiple pairs of ions during a quantum computation, and, more specifically, to pulses that can be constructed in an efficient manner and further can reduce the required laser power to perform the entangling gate operations.

An overall system that is able to perform quantum computations using trapped ions will include a classical computer, a system controller, and a quantum register. The classical computer performs supporting and system control tasks including selecting a quantum algorithm to be run by use of a user interface, such as graphics processing unit (GPU), compiling the selected quantum algorithm into a series of universal logic gates, translating the series of universal logic gates into laser pulses to apply on the quantum register, and pre-calculating parameters that optimize the laser pulses by use of a central processing unit (CPU). A software program for performing the task of decomposing and executing the quantum algorithms is stored in a non-volatile memory within the classical computer. The quantum register includes trapped ions that are coupled with various hardware, including lasers to manipulate internal hyperfine states (qubit states) of the trapped ions and an acousto-optic modulator to read-out the internal hyperfine states (qubit states) of the trapped ions. The system controller receives from the classical computer the pre-calculated parameters for power-optimal pulses at the beginning of running the selected algorithm on the quantum register, controls various hardware associated with controlling any and all aspects used to run the selected algorithm on the quantum register, and returns a read-out of the quantum register and thus output of results of the quantum computation(s) at the end of running the algorithm to the classical computer.

The methods and systems described herein include processes for translating a logic gate into laser pulses that are applied to a quantum register, and also processes for pre-calculating parameters that optimize the laser pulses that are applied to the quantum register and used to improve the performance of quantum computer.

Among several known sets of universal logic gates by which any quantum algorithm can be decomposed, a set of universal logic gates, commonly denoted as {R, XX}, is native to a quantum computing system of trapped ions described herein. Here, the R gate corresponds to manipulation of individual qubit states of trapped ions, and the XX gate (also referred to as an "entangling gate") corresponds to manipulation of the entanglement of two trapped ions. For those of ordinary skill in the art, it should be clear the R gate can be implemented with near perfect fidelity, while the formation of the XX gate is complex and requires optimization for a given type of trapped ions, number of ions in a chain of trapped ions, and the hardware and environment in which the trapped ions are trapped, to name just a few factors, such that the fidelity of the XX gate is increased and computational errors within a quantum computer are avoided or decreased. In the following discussion, methods of generating and optimizing a pulse used to perform computations based the formation of an XX gate that has an improved fidelity will be described.

As the size of a quantum computer increases, the complexity of the entangling gate operations used to perform quantum computations increases, and the complexity of the pulses used to perform these entangling gate operations also increases. The required laser power to implement such complex pulses subsequently increases, and thus an available laser power may limit the size of a quantum computer that can be implemented. The method and system described in this disclosure simplify the construction of the pulses and further reduce the required laser power to implement the pulses such that a quantum computer can be scaled up to a larger size so that it can perform more complex computational operations. This implies a faster execution of entangling gates for a given power budget. Errors that scale with the delivered laser power would decrease with smaller laser power requirement.

General Hardware Configurations

FIG. 1 is a partial view of an ion trap quantum computer, or system 100, according to one embodiment. The system 100 includes a classical (digital) computer 101, a system controller 118 and a quantum register that is a chain 102 of trapped ions (i.e., five shown) that extend along the Z-axis. The classical computer 101 includes a central processing unit (CPU), memory, and support circuits (or I/O). The memory is connected to the CPU, and may be one or more of a readily available memory, such as a read-only memory (ROM), a random access memory (RAM), floppy disk, hard disk, or any other form of digital storage, local or remote. Software instructions, algorithms and data can be coded and stored within the memory for instructing the CPU. The support circuits (not shown) are also connected to the CPU for supporting the processor in a conventional manner. The support circuits may include conventional cache, power supplies, clock circuits, input/output circuitry, subsystems, and the like.

An imaging objective 104, such as an objective lens with a numerical aperture (NA), for example, of 0.37, collects fluorescence along the Y-axis from the ions and maps each ion onto a multi-channel photo-multiplier tube (PMT) 106 for measurement of individual ions. Non-copropagating Raman laser beams from a laser 108, which are provided along the X-axis, perform operations on the ions. A diffractive beam splitter 110 creates an array of static Raman beams 112 that are individually switched using a multi-channel acousto-optic modulator (AOM) 114 and is configured to selectively act on individual ions. A global Raman laser beam 116 illuminates all ions at once. The system controller (also referred to as a "RF controller") 118 controls the AOM 114. The system controller 118 includes a central processing unit (CPU) 120, a read-only memory (ROM) 122, a random access memory (RAM) 124, a storage unit 126, and the like. The CPU 120 is a processor of the RF controller 118. The ROM 122 stores various programs and the RAM 124 is the working memory for various programs and data. The storage unit 126 includes a nonvolatile memory, such as a hard disk drive (HDD) or a flash memory, and stores various programs even if power is turned off. The CPU 120, the ROM 122, the RAM 124, and the storage unit 126 are interconnected via a bus 128. The RF controller 118 executes a control program which is stored in the ROM 122 or the storage unit 126 and uses the RAM 124 as a working area. The control program will include software applications that include program code that may be executed by processor in order to perform various functionalities associated with receiving and analyzing data and controlling any and all aspects of the methods and hardware used to create the ion trap quantum computer system 100 discussed herein.

Figure 2:
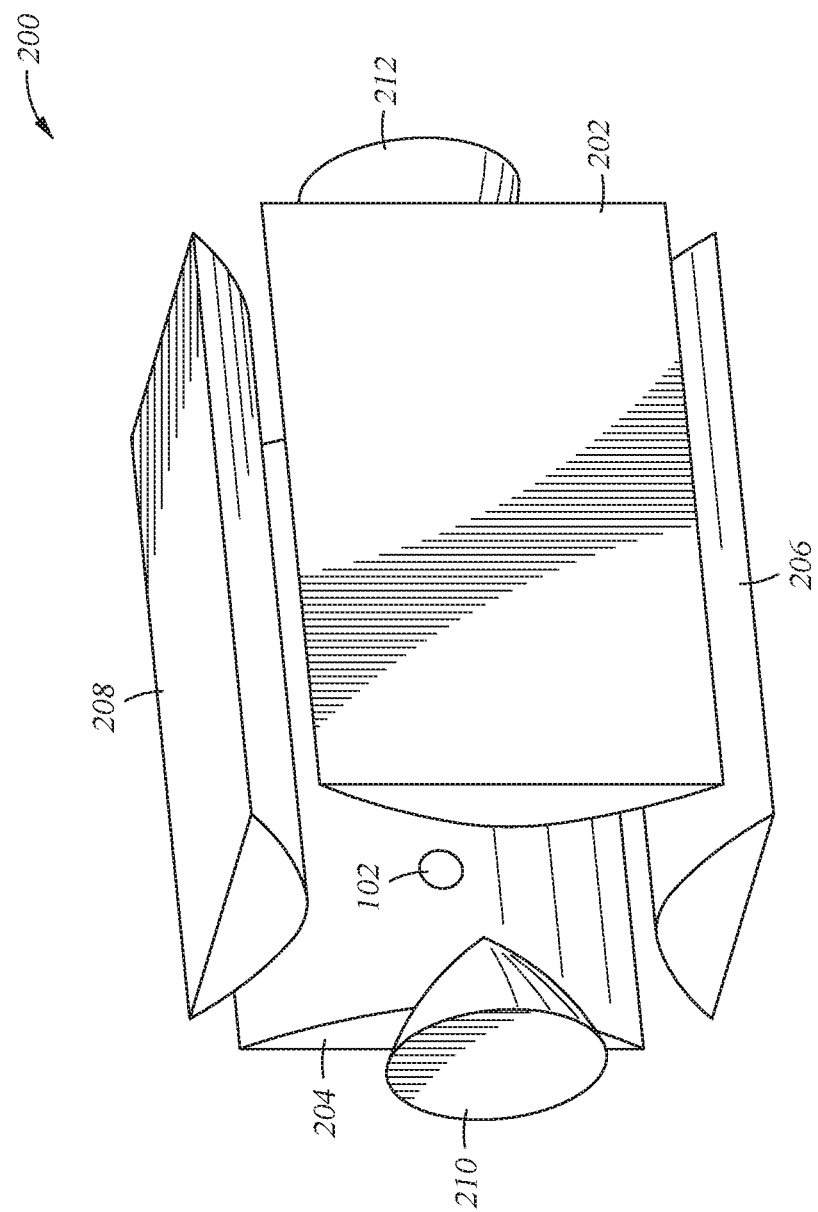
FIG. 2 depicts a schematic view of an ion trap for confining ions in a chain according to one embodiment.

FIG. 2 depicts a schematic view of an ion trap 200 (also referred to as a Paul trap) for confining ions in the chain 102 according to one embodiment. The confining potential is exerted by both static (DC) voltage and radio frequency (RF) voltages. A static (DC) voltage $V_S$ is applied to end-cap electrodes 210 and 212 to confine the ions along the Z-axis (also referred to as an "axial direction" or a "longitudinal direction"). The ions in the chain 102 are nearly evenly distributed in the axial direction due to the Coulomb interaction between the ions. In some embodiments, the ion trap 200 includes four hyperbolically-shaped electrodes 202, 204, 206, and 208 extending along the Z-axis.

During operation, a sinusoidal voltage $V_1$ (with an amplitude $V_{RF}/2$) is applied to an opposing pair of the electrodes 202, 204 and a sinusoidal voltage $V_2$ with a phase shift of 180° from the sinusoidal voltage $V_1$ (and the amplitude $V_{RF}/2$) is applied to the other opposing pair of the electrodes 206, 208 at a driving frequency $\omega_{RF}$, generating a quadrupole potential. In some embodiments, a sinusoidal voltage is only applied to one opposing pair of the electrodes 202, 204, and the other opposing pair 206, 208 is grounded. The quadrupole potential creates an effective confining force in the X-Y plane perpendicular to the Z-axis (also referred to as a "radial direction" or "transverse direction") for each of the trapped ions, which is proportional to a distance from a saddle point (i.e., a position in the axial direction (Z-direction)) at which the RF electric field vanishes. The motion in the radial direction (i.e., direction in the X-Y plane) of each ion is approximated as a harmonic oscillation (referred to as secular motion) with a restoring force towards the saddle point in the radial direction and can be modeled by spring constants $k_x$ and $k_y$, respectively, as is discussed in greater detail below. In some embodiments, the spring constants in the radial direction are modeled as equal when the quadrupole potential is symmetric in the radial direction. However, undesirably in some cases, the motion of the ions in the radial direction may be distorted due to some asymmetry in the physical trap configuration, a small DC patch potential due to inhomogeneity of a surface of the electrodes, or the like and due to these and other external sources of distortion the ions may lie off-center from the saddle points.

Trapped Ion Configuration and Quantum Bit Information

Figure 3A:
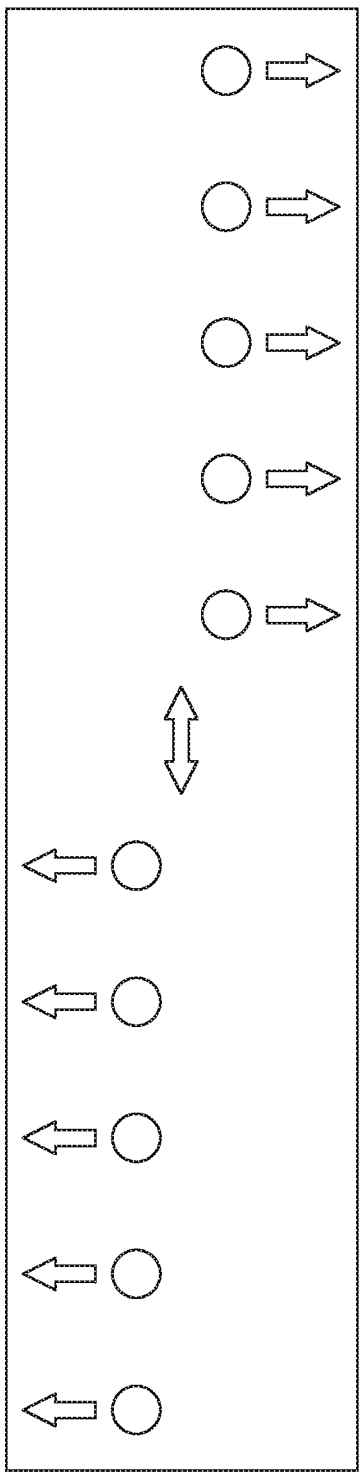
FIGS. 3A, 3B, and 3C depict a few schematic collective transverse motional mode structures of a chain of five trapped ions.
Figure 3B:
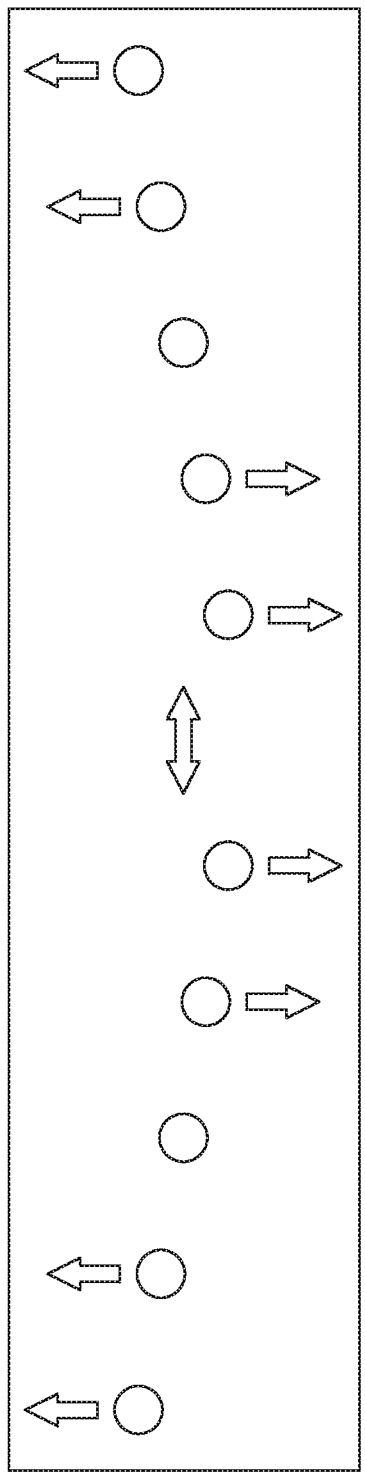
Figure 3C:
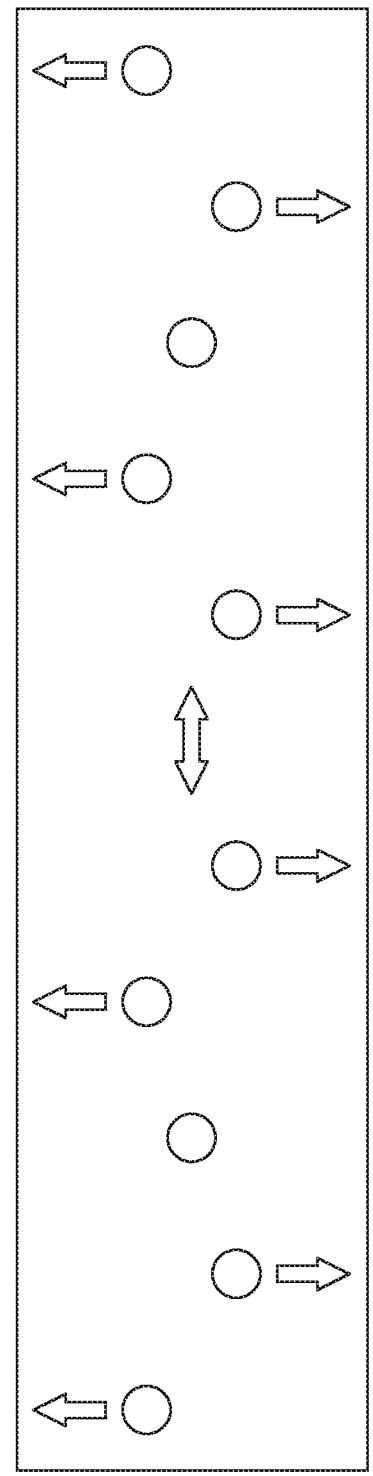

FIGS. 3A, 3B, and 3C depict a few schematic structures of collective transverse motional modes (also referred to simply as "motional mode structures") of a chain 102 of five trapped ions, for example. Here, the confining potential due to a static voltage $V_S$ applied to the end-cap electrodes 210 and 212 is weaker compared to the confining potential in the radial direction. The collective motional modes of the chain 102 of trapped ions in the transverse direction are determined by the Coulomb interaction between the trapped ions combined with the confining potentials generated by the ion trap 200. The trapped ions undergo collective transversal motions (referred to as "collective transverse motional modes," "collective motional modes," or simply "motional modes"), where each mode has a distinct energy (or equivalently, a frequency) associated with it. A motional mode having the p-th lowest energy is hereinafter referred to as $|n_{ph}\rangle_p$, where $n_{ph}$ denotes the number of motional quanta (in units of energy excitation, referred to as phonons) in the motional mode, and the number of motional modes P in a given transverse direction is equal to the number of trapped ions N in the chain 102. FIGS. 3A-3C schematically illustrates examples of different types of collective transverse motional modes that may be experienced by five trapped ions that are positioned in a chain 102. FIG. 3A is a schematic view of a common motional mode $|n_{ph}\rangle_P$ having the highest energy, where P is the number of motional modes. In the common motional mode $|n\rangle_P$, all ions oscillate in phase in the transverse direction. FIG. 3B is a schematic view of a tilt motional mode $|n_{ph}\rangle_{P-1}$ which has the second highest energy. In the tilt motional mode, ions on opposite ends move out of phase in the transverse direction (i.e., in opposite directions). FIG. 3C is a schematic view of a higher-order motional mode $|n_{ph}\rangle_{P-3}$ which has a lower energy than that of the tilt motional mode $|n_{ph}\rangle_{P-1}$, and in which the ions move in a more complicated mode pattern.

It should be noted that the particular configuration described above is just one among several possible examples of a trap for confining ions according to the present disclosure and does not limit the possible configurations, specifications, or the like of traps according to the present disclosure. For example, the geometry of the electrodes is not limited to the hyperbolic electrodes described above. In other examples, a trap that generates an effective electric field causing the motion of the ions in the radial direction as harmonic oscillations may be a multi-layer trap in which several electrode layers are stacked and an RF voltage is applied to two diagonally opposite electrodes, or a surface trap in which all electrodes are located in a single plane on a chip. Furthermore, a trap may be divided into multiple segments, adjacent pairs of which may be linked by shuttling one or more ions, or coupled by photon interconnects. A trap may also be an array of individual trapping regions arranged closely to each other on a micro-fabricated ion trap chip. In some embodiments, the quadrupole potential has a spatially varying DC component in addition to the RF component described above.

Figure 4:
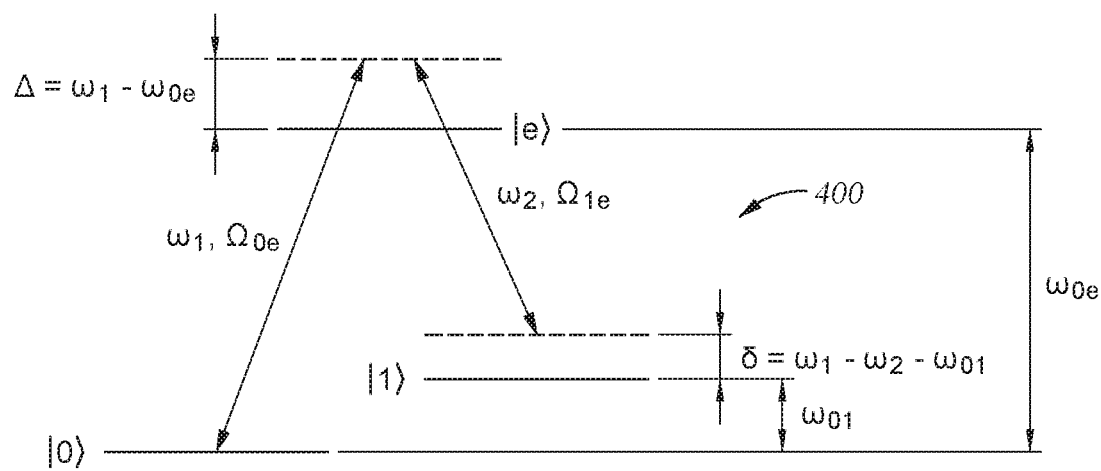
FIG. 4 depicts a schematic energy diagram of each ion in a chain of trapped ions according to one embodiment.

FIG. 4 depicts a schematic energy diagram 400 of each ion in the chain 102 of trapped ions according to one embodiment. In one example, each ion may be a positive Ytterbium ion, $^{171}Yb^+$, which has the $^2S_{1/2}$ hyperfine states (i.e., two electronic states) with an energy split corresponding to a frequency difference (referred to as a "carrier frequency") of $\omega_{01}/2\pi=12.642821$ GHz. A qubit is formed with the two hyperfine states, denoted as $|0\rangle$ and $|1\rangle$, where the hyperfine ground state (i.e., the lower energy state of the $^2S_{1/2}$ hyperfine states) is chosen to represent $|0\rangle$. Hereinafter, the terms "hyperfine states," "internal hyperfine states," and "qubits" may be interchangeably used to represent $|0\rangle$ and $|1\rangle$. Each ion may be cooled (i.e., kinetic energy of the ion may be reduced) to near the motional ground state $|0\rangle_p$ for any motional mode p with no phonon excitation (i.e., $n_{ph}=0$) by known laser cooling methods, such as Doppler cooling or resolved sideband cooling, and then the qubit state prepared in the hyperfine ground state $|0\rangle$ by optical pumping. Here, $|0\rangle$ represents the individual qubit state of a trapped ion whereas $|0\rangle_p$ with the subscript p denotes the motional ground state for a motional mode p of a chain 102 of trapped ions.

An individual qubit state of each trapped ion may be manipulated by, for example, a mode-locked laser at 355 nanometers (nm) via the excited $^2P_{1/2}$ level (denoted as $|e\rangle$). As shown in FIG. 4, a laser beam from the laser may be split into a pair of non-copropagating laser beams (a first laser beam with frequency $\omega_1$ and a second laser beam with frequency $\omega_2$) in the Raman configuration, and detuned by a one-photon transition detuning frequency $\Delta=\omega_1-\omega_{0e}$ with respect to the transition frequency $\omega_{0e}$ between $|0\rangle$ and $|e\rangle$, as illustrated in FIG. 4. A two-photon transition detuning frequency $\delta$ includes adjusting the amount of energy that is provided to the trapped ion by the first and second laser beams, which when combined is used to cause the trapped ion to transfer between the hyperfine states $|0\rangle$ and $|1\rangle$. When the one-photon transition detuning frequency $\Delta$ is much larger than a two-photon transition detuning frequency (also referred to simply as "detuning frequency") $\delta=\omega_1-\omega_2-\omega_{01}$ (hereinafter denoted as $\pm\mu$, $\mu$ being a positive value), single-photon Rabi frequencies $\Omega_{0e}(t)$ and $\Omega_{1e}(t)$ (which are time-dependent, and are determined by amplitudes and phases of the first and second laser beams), at which Rabi flopping between states $|0\rangle$ and $|e\rangle$ and between states $|1\rangle$ and $|e\rangle$ respectively occur, and a spontaneous emission rate from the excited state $|e\rangle$, Rabi flopping between the two hyperfine states $|0\rangle$ and $|1\rangle$ (referred to as a "carrier transition") is induced at the two-photon Rabi frequency $\Omega(t)$. The two-photon Rabi frequency $\Omega(t)$ has an intensity (i.e., absolute value of amplitude) that is proportional to $\Omega_{0e}\Omega_{1e}/2\Delta$, where $\Omega_{0e}$ and $\Omega_{1e}$ are the single-photon Rabi frequencies due to the first and second laser beams, respectively. Hereinafter, this set of non-copropagating laser beams in the Raman configuration to manipulate internal hyperfine states of qubits (qubit states) may be referred to as a "composite pulse" or simply as a "pulse," and the resulting time-dependent pattern of the two-photon Rabi frequency $\Omega(t)$ may be referred to as an "amplitude" of a pulse or simply as a "pulse," which are illustrated and further described below. The detuning frequency $\delta=\omega_1-\omega_2-\omega_{01}$ may be referred to as detuning frequency of the composite pulse or detuning frequency of the pulse. The amplitude of the two-photon Rabi frequency $\Omega(t)$, which is determined by amplitudes of the first and second laser beams, may be referred to as an "amplitude" of the composite pulse.

It should be noted that the particular atomic species used in the discussion provided herein is just one example of atomic species which has stable and well-defined two-level energy structures when ionized and an excited state that is optically accessible, and thus is not intended to limit the possible configurations, specifications, or the like of an ion trap quantum computer according to the present disclosure. For example, other ion species include alkaline earth metal ions ($Be^+$, $Ca^+$, $Sr^+$, $Mg^+$, and $Ba^+$) or transition metal ions ($Zn^+$, $Hg^+$, $Cd^+$).

Figure 5:
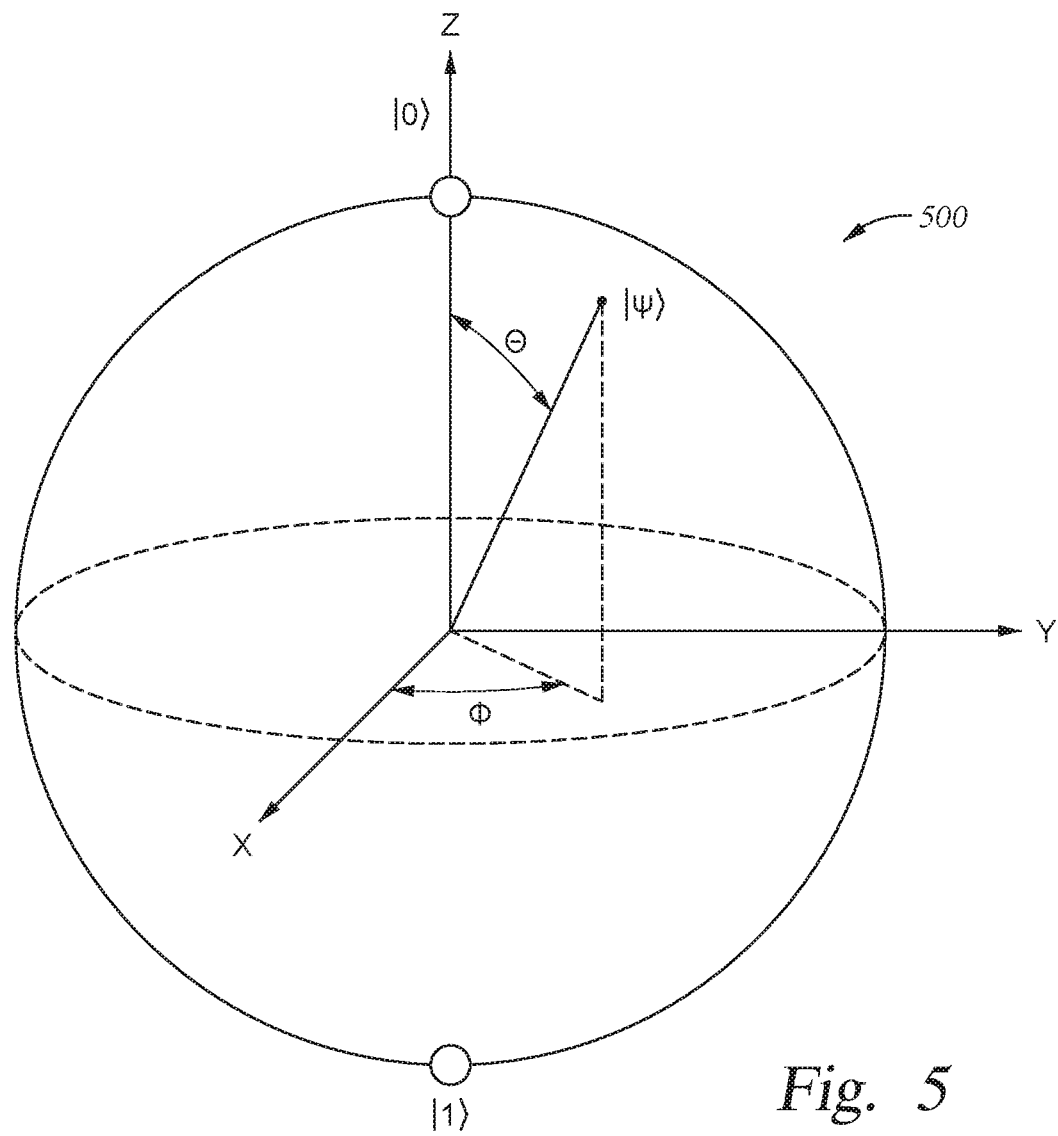
FIG. 5 depicts a qubit state of an ion represented as a point on a surface of the Bloch sphere.

FIG. 5 is provided to help visualize a qubit state of an ion is represented as a point on a surface of the Bloch sphere 500 with an azimuthal angle $\phi$ and a polar angle $\theta$. Application of the composite pulse as described above, causes Rabi flopping between the qubit state $|0\rangle$ (represented as the north pole of the Bloch sphere) and $|1\rangle$ (the south pole of the Bloch sphere) to occur. Adjusting time duration and amplitudes of the composite pulse flips the qubit state from $|0\rangle$ to $|1\rangle$ (i.e., from the north pole to the south pole of the Bloch sphere), or the qubit state from $|1\rangle$ to $|0\rangle$ (i.e., from the south pole to the north pole of the Bloch sphere). This application of the composite pulse is referred to as a "$\pi$-pulse". Further, by adjusting time duration and amplitudes of the composite pulse, the qubit state $|0\rangle$ may be transformed to a superposition state $|0\rangle+|1\rangle$, where the two qubit states $|0\rangle$ and $|1\rangle$ are added and equally-weighted in-phase (a normalization factor of the superposition state is omitted hereinafter without loss of generality) and the qubit state $|1\rangle$ to a superposition state $|0\rangle-|1\rangle$, where the two qubit states $|0\rangle$ and $|1\rangle$ are added equally-weighted but out of phase. This application of the composite pulse is referred to as a "$\pi/2$-pulse". More generally, a superposition of the two qubits states $|0\rangle$ and $|1\rangle$ that are added and equally-weighted is represented by a point that lies on the equator of the Bloch sphere. For example, the superposition states $|0\rangle\pm|1\rangle$ correspond to points on the equator with the azimuthal angle $\phi$ being zero and $\pi$, respectively. The superposition states that correspond to points on the equator with the azimuthal angle $\phi$ are denoted as $|0\rangle+e^{i\phi}|1\rangle$ (e.g., $|0\rangle\pm i|1\rangle$ for $\phi=\pm\pi/2$). Transformation between two points on the equator (i.e., a rotation about the Z-axis on the Bloch sphere) can be implemented by shifting phases of the composite pulse.

Figure 6A:
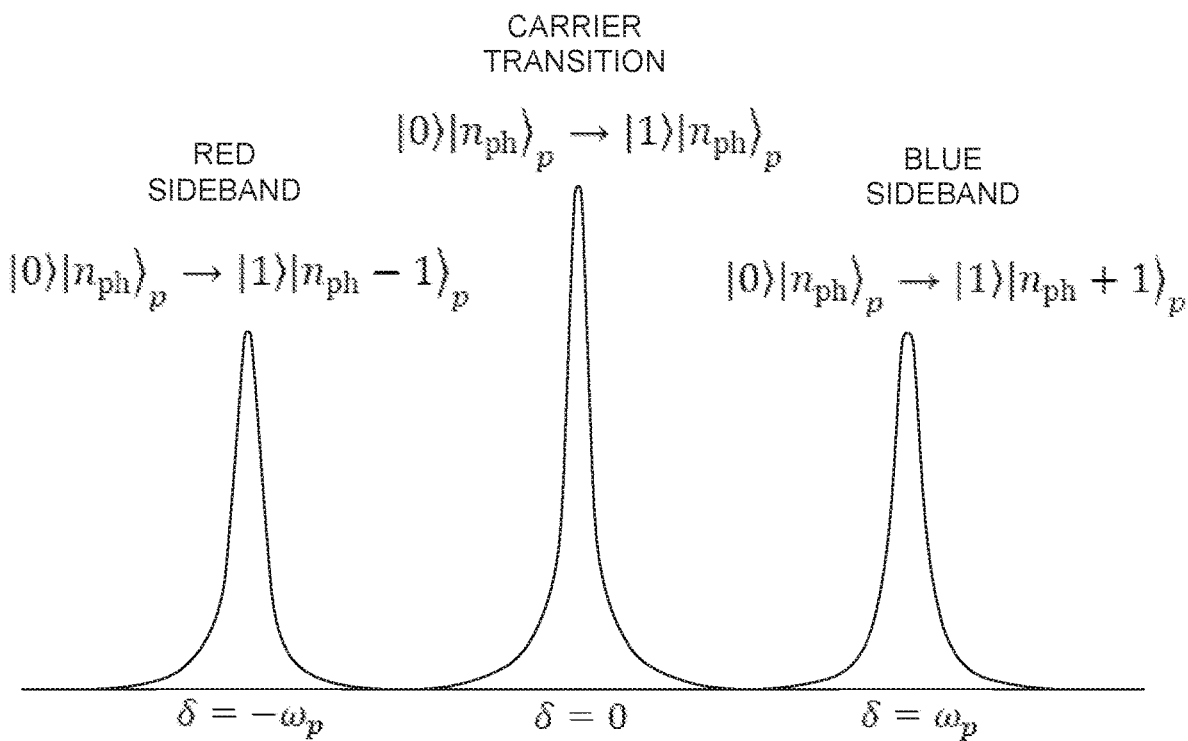
FIGS. 6A and 6B depict schematic views of motional sideband spectrum of each ion and a motional mode according to one embodiment.
Figure 6B:
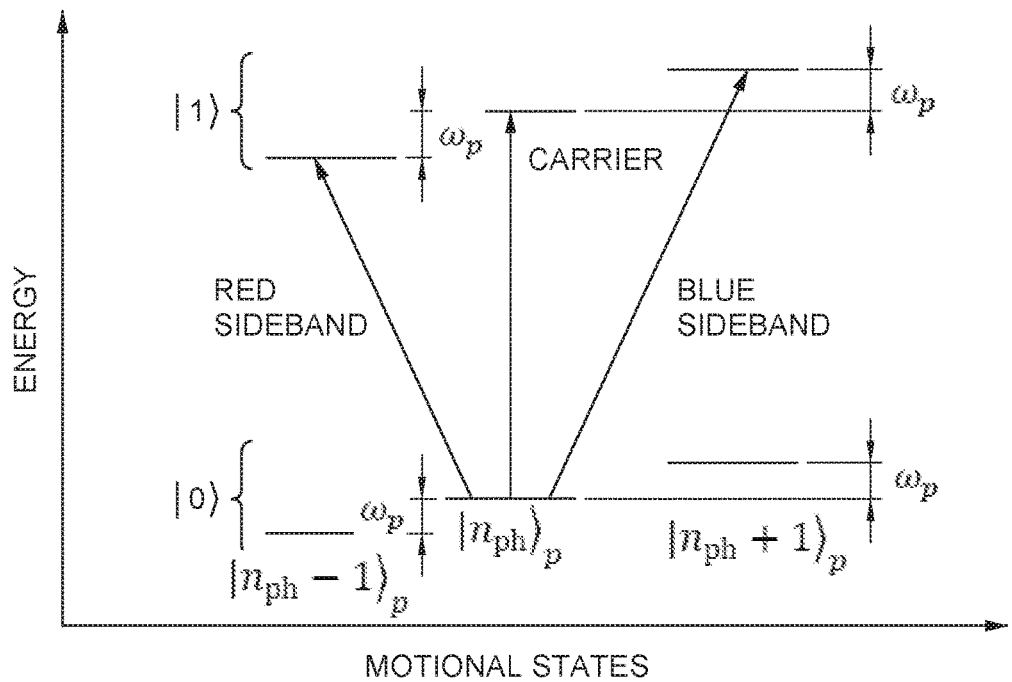

In an ion trap quantum computer, the motional modes may act as a data bus to mediate entanglement between two qubits and this entanglement is used to perform an XX gate operation. That is, each of the two qubits is entangled with the motional modes, and then the entanglement is transferred to an entanglement between the two qubits by using motional sideband excitations, as described below. FIGS. 6A and 6B schematically depict views of a motional sideband spectrum for an ion in the chain 102 in a motional mode $|n_{ph}\rangle_p$ having frequency $\omega_p$ according to one embodiment. As illustrated in FIG. 6B, when the detuning frequency of the composite pulse is zero (i.e., a frequency difference between the first and second laser beams is tuned to the carrier frequency, $\delta=\omega_1-\omega_2-\omega_{01}=0$), simple Rabi flopping between the qubit states $|0\rangle$ and $|1\rangle$ (carrier transition) occurs. When the detuning frequency of the composite pulse is positive (i.e., the frequency difference between the first and second laser beams is tuned higher than the carrier frequency, $\delta=\omega_1-\omega_2-\omega_{01}=\mu>0$, referred to as a blue sideband), Rabi flopping between combined qubit-motional states $|0\rangle|n_{ph}\rangle_p$ and $|1\rangle|n_{ph}+1\rangle_p$ occurs (i.e., a transition from the p-th motional mode with n-phonon excitations denoted by $|n_{ph}\rangle_p$ to the p-th motional mode with $(n_{ph}+1)$-phonon excitations denoted by $|n_{ph}+1\rangle_p$ occurs when the qubit state $|0\rangle$ flips to $|1\rangle$). When the detuning frequency of the composite pulse is negative (i.e., the frequency difference between the first and second laser beams is tuned lower than the carrier frequency by the frequency $\omega_p$ of the motional mode $|n_{ph}\rangle_p$, $\delta=\omega_1-\omega_2-\omega_{01}=-\mu<0$, referred to as a red sideband), Rabi flopping between combined qubit-motional states $|0\rangle|n_{ph}\rangle_p$ and $|1\rangle|n_{ph}-1\rangle_p$ occurs (i.e., a transition from the motional mode $|n_{ph}\rangle$ to the motional mode $|n_{ph}-1\rangle_p$ with one less phonon excitations occurs when the qubit state $|0\rangle$ flips to $|1\rangle$). A π/2-pulse on the blue sideband applied to a qubit transforms the combined qubit-motional state $|0\rangle|n_{ph}\rangle_p$ into a superposition of $|0\rangle|n_{ph}\rangle_p$ and $|1\rangle|n_{ph}+1\rangle_p$. A π/2-pulse on the red sideband applied to a qubit transforms the combined qubit-motional $|0\rangle|n_{ph}\rangle_p$ into a superposition of $|0\rangle|n_{ph}\rangle_p$ and $|1\rangle|n_{ph}-1\rangle_p$. When the two-photon Rabi frequency $\Omega(t)$ is smaller as compared to the detuning frequency $\delta=\omega_1-\omega_2-\omega_{01}=\pm\mu$, the blue sideband transition or the red sideband transition may be selectively driven. Thus, a qubit can be entangled with a desired motional mode by applying the right type of pulse, such as a π/2-pulse, which can be subsequently entangled with another qubit, leading to an entanglement between the two qubits. Entanglement between qubits is needed to perform an XX-gate operation in an ion trap quantum computer.

By controlling and/or directing transformations of the combined qubit-motional states as described above, an XX-gate operation may be performed on two qubits (i-th and j-th qubits). In general, the XX-gate operation (with maximal entanglement) respectively transforms two-qubit states $|0\rangle_i|0\rangle_j$, $|0\rangle_i|1\rangle_j$, $|1\rangle_i|0\rangle_j$, and $|1\rangle_i|1\rangle_j$ as follows:

$|0\rangle_i|0\rangle_j \to |0\rangle_i|0\rangle_j - i|1\rangle_i|1\rangle_j$ $|0\rangle_i|1\rangle_j \to |0\rangle_i|1\rangle_j - i|1\rangle_i|0\rangle_j$ $|1\rangle_i|0\rangle_j \to -i|0\rangle_i|1\rangle_j + |1\rangle_i|0\rangle_j$ $|1\rangle_i|1\rangle_j \to -i|0\rangle_i|0\rangle_j + |1\rangle_i|1\rangle_j$ For example, when the two qubits (i-th and j-th qubits) are both initially in the hyperfine ground state $|0\rangle$ (denoted as $|0\rangle_i|0\rangle_j$) and subsequently a π/2-pulse on the blue sideband is applied to the i-th qubit, the combined state of the i-th qubit and the motional mode $|0\rangle_i|n_{ph}\rangle_p$ is transformed into a superposition of $|0\rangle_i|n_{ph}\rangle_p$ and $|1\rangle_i|n_{ph}+1\rangle_p$, and thus the combined state of the two qubits and the motional mode is transformed into a superposition of $|0\rangle_i|0\rangle_j|n_h\rangle_p$ and $|1\rangle_i|0\rangle_j|n_{ph}+1\rangle_p$. When a π/2-pulse on the red sideband is applied to the j-th qubit, the combined state of the j-th qubit and the motional mode $|0\rangle_j|n_{ph}\rangle$ is transformed to a superposition of $|0\rangle_j|n_{ph}\rangle_p$ and $|1\rangle_j|n_{ph}-1\rangle_p$ and the combined state $|0\rangle_j|n_{ph}+1\rangle_p$ is transformed into a superposition of $|0\rangle_j|n_{ph}+1\rangle_p$ and $|1\rangle_j|n_{ph}\rangle_p$.

Thus, applications of a π/2-pulse on the blue sideband on the i-th qubit and a π/2-pulse on the red sideband on the j-th qubit may transform the combined state of the two qubits and the motional mode $|0\rangle_i|0\rangle_j|n_{ph}\rangle_p$ into a superposition of $|0\rangle_i|0\rangle_j|n_{ph}\rangle_p$ and $|1\rangle_i|1\rangle_j|n_{ph}\rangle_p$, the two qubits now being in an entangled state. For those of ordinary skill in the art, it should be clear that two-qubit states that are entangled with motional mode having a different number of phonon excitations from the initial number of phonon excitations $n_{ph}$ (i.e., $|1\rangle_i|0\rangle_j|n_{ph}+1\rangle_p$ and $|0\rangle_i|1\rangle_j|n_{ph}-1\rangle_p$) can be removed by a sufficiently complex pulse sequence, and thus the combined state of the two qubits and the motional mode after the XX-gate operation may be considered disentangled as the initial number of phonon excitations $n_{ph}$ in the p-th motional mode stays unchanged at the end of the XX-gate operation. Thus, qubit states before and after the XX-gate operation will be described below generally without including the motional modes.

More generally, the combined state of m-th and n-th qubits transformed by the application of pulses on the sidebands for duration τ (referred to as a "gate duration"), having amplitudes $\Omega^{(m)}$ and $\Omega^{(n)}$ and detuning frequency μ, can be described in terms of an entangling interaction $\chi^{(m,n)}(\tau)$ as follows:

$|0\rangle_m|0\rangle_n \to \cos(\chi^{(m,n)}(\tau)/2)|0\rangle_m|0\rangle_n - i \sin(\chi^{(m,n)}(\tau)/2)|1\rangle_m|1\rangle_n$ $|0\rangle_m|1\rangle_n \to \cos(\chi^{(m,n)}(\tau)/2)|0\rangle_m|1\rangle_n - i \sin(\chi^{(m,n)}(\tau)/2)|1\rangle_m|0\rangle_n$ $|1\rangle_m|0\rangle_n \to -i \sin(\chi^{(m,n)}(\tau)/2)|0\rangle_m|1\rangle_n + \cos(\chi^{(m,n)}(\tau)/2)|1\rangle_m|0\rangle_n$ $|1\rangle_m|1\rangle_n \to -i \sin(\chi^{(m,n)}(\tau)/2)|0\rangle_m|0\rangle_n + \cos(\chi^{(m,n)}(\tau)/2)|1\rangle_m|1\rangle_n$ where, $$\chi^{(m,n)}(\tau) = -4\sum_{p=1}^{P}\eta_p^{(m)}\eta_p^{(n)}\int_0^{\tau} dt_2 \int_0^{t_2} dt_1 \Omega^{(m)}(t_2)\Omega^{(n)}(t_1)\cos(\mu t_2)\cos(\mu t_1)\sin[\omega_p(t_2-t_1)]$$

and $\eta_p^{(m)}$ is the Lamb-Dicke parameter that quantifies the coupling strength between the m-th ion and the p-th motional mode having the frequency $\omega_p$, and P is the number of the motional modes (equal to the number N of ions in the chain 102).

Constructing Pulses for Simultaneous Entangling Gate Operations

The entanglement interaction between two qubits described above can be used to perform an XX-gate operation. The XX-gate operation (XX gate) along with single-qubit operation (R gate) forms a set of universal gates {R, XX} that can be used to build a quantum computer that is configured to perform desired computational processes. To perform an XX-gate operation between m-th and n-th qubits, pulses that satisfy the condition $\chi^{(m,n)}(\tau)=\theta^{(m,n)}$ ($0<\theta^{(m,n)}\leq\pi/2$) (i.e., the entangling interaction $\chi^{(m,n)}(\tau)$ has a desired value $\theta^{(m,n)}$, referred to as condition for a non-zero entanglement interaction) are constructed and applied to the m-th and the n-th qubits. The transformations of the combined state of the m-th and the n-th qubits described above corresponds to the XX-gate operation with maximal entanglement when $\theta^{(m,n)}=\pi/2$. Amplitudes $\chi^{(m)}(t)$ and $\Omega^{(n)}(t)$ of the pulses to be applied to the m-th and the n-th qubits are control parameters that can be adjusted to ensure a non-zero tunable entanglement of the m-th and the n-th qubits to perform a desired XX gate operation on m-th and n-th qubits.

To perform entangling gate operations simultaneously on two pairs of ions, for example, a pair of m-th and n-th ions (referred to simply as (m,n)) and a pair of m'-th and n'-th ions (referred to simply as (m',n')), pulses having amplitudes $\Omega^{(m)}(t)$, $\Omega^{(n)}(t)$, $\Omega^{(m')}(t)$, and $\Omega^{(n')}(t)$ are individually applied to the m-th, n-th, m'-th, and n'-th ions, respectively. The amplitudes $\Omega^{(m)}(t)$, $\Omega^{(n)}(t)$, $\Omega^{(m')}(t)$, and $\Omega^{(m')}(t)$ of the pulses are determined such that the pairs of ions that are to be entangled (i.e., (m,n), (m',n')) are coupled to each other and pairs of ions that are not to be entangled (i.e., (m,m'), (m,n'), (n,m'), (n,n')) are decoupled from each other at the end of application of the pulses with the amplitudes $\Omega^{(m)}(t)$, $\Omega^{(n)}(t)$, $\Omega^{(m')}(t)$, and $\Omega^{(m')}(t)$. That is, for the pairs that are to be entangled, the condition for a non-zero entanglement interaction $\Omega^{(l,l')}(\tau)=\theta^{(l,l')}$ ((l,l')=(m,n),(m',n')) must be satisfied, and for pairs of ions that are not to be entangled, the condition $\chi^{(l,l')}(\tau)=0$ ((l,l')≠(m,n), (m', n')) (i.e., overall entangling interaction between each decoupled pair is zero) must be satisfied (referred to as a condition for decoupling).

The simultaneous entangling gate operations can be performed on a larger number of pairs of ions. All ions in these pairs (i.e. ions that are each to be entangled with another ion) are referred to as "participating ions" or "participating qubits" in the simultaneous entangling gate operations. The number of the participating ions in the simultaneous entangling gate operations is denoted as $N_{EASE}$ hereinafter. To perform simultaneous entangling gate operations on the $N_{EASE}$ participating ions, pulses each having amplitude $\Omega^{(m)}(t)$ (m=1, 2, ..., $N_{EASE}$) are individually applied to m-th ions. The amplitudes $\Omega^{(m)}(t)$ of the pulses (m=1, 2, ..., $N_{EASE}$) are determined such that the condition for non-zero entangling interaction, $\chi^{(l,l')}(\tau)=\theta^{(l,l')}(0<\theta^{(l,l')}\leq\pi/2)$ is satisfied for the pairs of ions (l,l') that are to be entangled and the condition for decoupling $\chi^{(l,l')}(\tau)=0$ is satisfied for the pairs of ions (l,l') that are not to be entangled.

The control parameters, the amplitudes $\Omega^{(m)}(t)$ of the pulses, must also satisfy conditions that all of the N trapped ions in the chain 102 that are displaced from their initial positions as the motional modes are excited by the delivery of the pulse return to the initial positions. The m-th qubit in a superposition state $|0\rangle\pm|1\rangle$ is displaced due to the excitation of the p-th motional mode during the gate duration T and follows the trajectories $\pm\alpha_p^{(m)}(t')$ in phase space (position and momentum) of the p-th motional mode. The trajectories $\alpha_p^{(m)}(t')=\eta_p^{(m)}\int_0^{t'}\Omega^{(m)}(t)\cos(\mu t)e^{i\omega_p t}dt$ are determined by the amplitude $\Omega^{(m)}(t)$ and the detuning frequency $\mu$ of the pulse. Thus, for the chain 102 of N trapped ions, the condition $\alpha_p^{(m)}(\tau)=0$ (i.e., the trajectories $\alpha_p^{(m)}(\tau)$ must be closed, referred to as a condition for returning of trapped ions to their original positions and momentum values (or closure of phase space trajectories) must be imposed for all the P motional modes (p=1, 2, ..., P) in addition to the condition for non-zero entangling interaction, $\chi^{(m,n)}(\tau)=\theta^{(m,n)}$ ($0<\theta^{(m,n)}\leq\pi/2$).

The amplitudes of the pulse $\Omega^{(m)}(t)$ (m=1, 2, ..., $N_{EASE}$), as the control parameters, are determined such that these conditions are satisfied, by dividing the gate duration into $N_{seg}$ equi-spaced segments (k=1, 2, ..., $N_{seg}$), and varying the amplitude of the pulse $\Omega^{(m)}(t)$ from one segment to another. Denoting the amplitude of the pulse $\Omega^{(m)}(t)$ during a segment k as $\Omega_k^{(m)}$, the condition for returning of trapped ions to their original positions and momentum values can be rewritten as $$\alpha_p^{(m)}(\tau) = 0 \mapsto \sum_{k=1}^{N_{seg}} M_{pk}\Omega_k^{(m)} = 0 \ (p=1, 2, \ldots, 2P)$$

where $M_{pk}$ is defined as $M_{pk}=\int_{(k-1)\tau/N_{seg}}^{k\tau/N_{seg}} \cos(\mu t)\cos(\omega_p t)dt$ (p=1,2,..., P, k=1,2,..., $N_{seg}$), $M_{p+P,k}=\int_{(k-1)\tau/N_{seg}}^{k\tau/N_{seg}} \cos(\mu t)\cos(\omega_p t)dt$ (p=1,2,..., P, k=1,2,..., $N_{seg}$).

Equivalently, the condition for returning of trapped ions to their original positions and momentum values (e.g., closure of phase space trajectories) can be written as $M\vec{\Omega}^{(m)}=0$ in a matrix form, where M is a 2P×$N_{seg}$ coefficient matrix of $M_{pk}$ and $\vec{\Omega}^{(m)}$ is a $N_{seg}$ amplitude vector of $\Omega_k^{(m)}$. The number of the segments $N_{seg}$ is chosen to be larger than twice the number of motional modes 2P. Thus, there are $N_0$ (=$N_{seg}$−2P) non-trivial (i.e., at least one of the amplitudes $\Omega_k^{(m)}$ is non-zero) amplitude vectors of $\vec{\Omega}^{[\alpha]}(\alpha=1, 2, \ldots, N_0)$ that satisfy the condition for returning of trapped ions to their original positions and momentum values.

The conditions for non-zero entangling interaction and decoupling can be rewritten $$\chi^{(m,n)}(\tau) = \begin{cases} \theta^{(m,n)} & \text{if } m \text{ and } n \text{ are to be entangled} \\ 0 & \text{otherwise} \end{cases}$$

$$\mapsto \sum_{k=1}^{N_{seg}}\sum_{l=1}^{k}\Omega_k^{(m)}D_{kl}^{(m,n)}\Omega_l^{(n)} = \begin{cases} \theta^{(m,n)} & \text{if } m \text{ and } n \text{ are to be entangled} \\ 0 & \text{otherwise} \end{cases}$$

where $D_{kl}^{(m,n)}$ is defined as $$D_{kl}^{(m,n)} = -4\sum_{p=1}^{P}\eta_p^{(m)}\eta_p^{(n)}\int_{(k-1)\tau/N_{seg}}^{k\tau/N_{seg}}dt_2\int_{(l-1)\tau/N_{seg}}^{\min(t_2, \frac{l\tau}{N_{seg}})}dt_1\cos(\mu t_2)\cos(\mu t_1)\sin[\omega_p(t_1-t_2)],$$

or equivalently, $(\vec{\Omega}^{(m)})^T D^{(m,n)}\vec{\Omega}^{(n)}=\theta^{(m,n)}$ (if m and n are to be entangled) or 0 (otherwise) in a matrix form, where $D^{(m,n)}$ is a $N_{seg}\times N_{seg}$ coefficient matrix of $D_{kl}^{(m,n)}$ and $(\vec{\Omega}^{(m)})^T$ is a transposed vector of $\vec{\Omega}^{(m)}$. It should be noted the condition for returning of trapped ions to their original positions and momentum values and the conditions for non-zero entangling interaction and decoupling can in principle be written in a form known as a quadratically constrained quadratic program (QCQP) with respect to the control parameters $\Omega_k^{(m)}$. In general, QCQP is known to be a non-deterministic polynomial-time (NP) hard problem (that is at least as hard as any NP-problem). However, in the embodiments described herein, these conditions form a special case of QCQP and thus can be converted in a form that is not a NP hard problem, such that a set of $N_{EASE} \times N_{seg}$ control parameters $\Omega_k^{(m)}$ is determined with overhead that increase polynomially with respect to the number of the participating ions $N_{EASE}$. This method for determining a set of $N_{EASE} \times N_{seg}$ control parameters $\Omega_k^{(m)}$ is referred to as an efficient arbitrary simultaneous entangling (EASE) protocol and a gate operation performed by the pulses having amplitudes $\Omega_k^{(m)}(t)$ ($m=1, 2, \ldots, N_{EASE}$) having the determined amplitudes is referred to as EASE gate hereinafter.

EASE Protocol and EASE Gate

Figure 7:
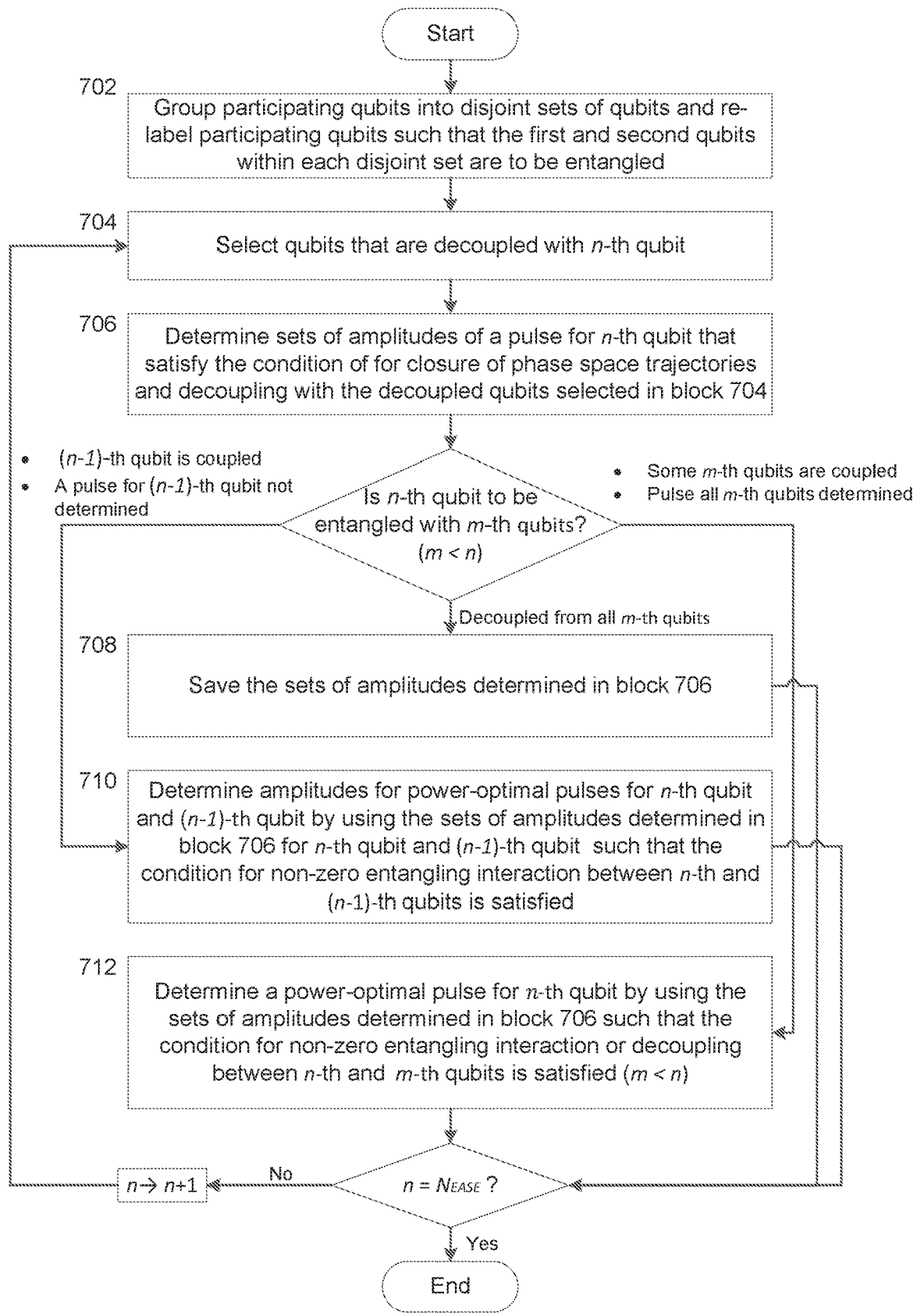
FIG. 7 depicts a flowchart illustrating a method to determine a set of control parameters (EASE protocol) according to one embodiment.

FIG. 7 depicts a flowchart illustrating a method 700 to determine a set of control parameters $\Omega_k^{(m)}$ (EASE protocol) according to one embodiment. In this example, the chain 102 of N trapped ions is a quantum register, in which the two hyperfine states of each of the N trapped ions form a qubit.

In the example described herein, a desired quantum algorithm is selected by a classical computer (not shown) by use of a user interface, such as graphics processing unit (GPU) (not shown), and decomposed into R gate operations (single-qubit gate operations) and XX gate operations (also referred to as entangling gate operations or two-qubit operations) on multiple pairs of qubits by the software program(s) within the classical computer. Among all the entangling gate operations, entangling gate operations on selected pairs of qubits ($N_{EASE}$ participating qubits in total) are determined to be performed simultaneously (an EASE gate) and pulses sequences to be applied to the $N_{EASE}$ participating qubits to cause entanglement between the selected pairs of qubits to perform the EASE gate operation are determined using the method 700 (the EASE protocol) as described below further by the software program(s) within the classical computer. The pulses determined by the software program(s) are applied to the $N_{EASE}$ participating qubits within the quantum register (the chain of N trapped ions) to perform the EASE gate operation on the selected pairs of qubits, controlled by a system controller.

At the beginning of the EASE protocol, each of the $N_{EASE}$ participating qubits is initially labeled with a number n ($n=1, 2, \ldots, N_{EASE}$), for example, in the order that the $N_{EASE}$ participating qubits are aligned in the chain 102 of N trapped ions. The $N_{EASE}$ participating qubits may be initially labeled in any other order. A qubit labeled with a number n may also be referred to as n-th qubit hereinafter.

In block 702 (pre-processing), the $N_{EASE}$ participating qubits are grouped into disjoint sets of qubits. The $N_{EASE}$ participating qubits are re-labeled such that qubits within each disjoint set are labeled with consecutive numbers and qubits that are labeled with the smallest and the second smallest numbers within each disjoint set (referred to as the first and second qubits in the disjoint set) correspond to one of the selected pairs on which entangling gate operations are performed. For example, the chain 102 may have 11 trapped ions (i.e., qubits initially labeled with numbers 1 to 11) and entangling gates may be performed simultaneously on pairs of qubits (1, 2), (1, 4), (1, 5), (3, 6), and (3, 8). Then, the participating qubits are qubits labeled with 1-6 and 8. A first disjoint set may include qubits 1, 2, 4, and 5, and a second disjoint set may include qubits 3, 6, and 8. The qubits in the first disjoint set are re-labeled with 1-4 and the qubits in the second disjoint set are re-labeled with 5-7.

To construct a pulse having amplitude $\Omega^{(n)}(t)$ to be individually applied to n-th qubit ($n=1, 2, \ldots, N_{EASE}$), at first, amplitude $\Omega^{(1)}(t)$ of a first pulse to be applied to the first qubit (labeled with 1) and amplitude $\Omega^{(2)}(t)$ of a second pulse to be applied to the second qubit (labeled with 2) are determined. Based on the determined amplitudes $\Omega^{(1)}(t)$ and $\Omega^{(2)}(t)$ of the first and second pulses, amplitude $\Omega^{(3)}(t)$ of a third pulse to be applied to the third qubit (labeled with 3) is determined. This process is then continued until amplitude $\Omega^{(N_{EASE})}(t)$ of a $N_{EASE}$-th pulse to be applied to $N_{EASE}$-th qubit (labeled with $N_{EASE}$) is determined, and thus the amplitudes of the pulses to be applied to all the $N_{EASE}$ participating qubits are determined.

In block 704, as an initial step to determine amplitude $\Omega^{(n)}(t)$ of a n-th pulse to be applied to n-th qubit ($n=1, 2, \ldots, N_{EASE}$), qubits that are not to be entangled with the n-th qubit (referred to as "disentangled qubit" and labeled with s) among qubits labeled with m ($m=1, 2, \ldots, n-1$). That is, the n-th qubit and the s-th qubit ($s \leq n-1$) do not correspond to any of the selected pairs on which entangling gate operations are to be performed. The number of the disentangled qubits is denoted as $N_s$ hereinafter.

In block 706, among $N_0$ non-trivial sets of amplitudes $\Omega_k^{(n)}$ that satisfy the condition for returning of trapped ions to their original positions and momentum values ($M \vec{\Omega}^{(n)}=0$), one or more sets of amplitudes $\Omega_k^{(n)}$ that satisfy the condition for decoupling ($\Sigma_{k=1}^{N_{seg}} \Sigma_{l=1}^{k} \Omega_k^{(s)} D_{kl}^{(s,n)} \Omega_l^{(n)}=0$) between the n-th qubit and the s-th disentangled qubit are determined based on the amplitudes $\Omega_k^{(s)}$ ($k=1, 2, \ldots, N_{seg}$) of s-th pulse to be applied to s-th qubit. The amplitudes $\Omega_k^{(s)}$ ($k=1, 2, \ldots, N_{seg}$) will have been defined or determined in previous iterations. There are ($N_0-(n-1)$) sets of amplitudes $\Omega_k^{(n)}$ that satisfy the condition for returning of trapped ions to their original positions and momentum values and those sets of amplitudes can be linearly combined to result in $\Omega_k^{(n)}$.

Following the initial steps to determine the amplitude $\Omega^{(n)}(t)$ of the n-th pulse to be applied to n-th qubit ($n=1, 2, \ldots, N_{EASE}$) in blocks 704 and 706, if all of the m-th qubits ($m=1, 2, \ldots, n-1$) are decoupled from the n-th qubit, the process proceeds to block 708. If some of the m-th qubits ($m=1, 2, \ldots, n-1$) (including $(n-1)$-th qubit) are coupled to the n-th qubit and a pulse to be applied to one of the m-th qubits (e.g., $(n-1)$-th qubit) has not yet determined, the process proceeds to block 710. This case occurs for the second qubit in every disjoint set. If some of the m-th qubits ($m=1, 2, \ldots, n-1$) are coupled to the n-th qubit and pulses to be applied to all of the m-th qubits have been determined, the process proceeds to block 712.

In block 708, the sets of amplitudes $\vec{\Omega}^{[\beta]}$ ($\beta=1, 2, \ldots, N_0-(n-1)$) for the n-th qubit are saved. In this case, all of the m-th qubits ($m=1, 2, \ldots, n-1$) are decoupled from the n-th qubit. The process returns to block 704 for determining amplitude $\Omega^{(n+1)}$ of a $(n+1)$-th pulse to be applied to $(n+1)$-th qubit.

In block 710, amplitude $\Omega^{(n-1)}(t)$ of a $(n-1)$-th pulse to be applied to $(n-1)$-th qubit has not been determined. Thus, a linear combination $\vec{\Omega}^{(n)} = \Sigma_{\beta=1}^{N_0-(n-1)} \Lambda_{(\beta)}^{(n)} \vec{\Omega}^{[\beta]}$ of the sets of amplitudes $\vec{\Omega}^{[\beta]}$, determined in block 706 for the n-th iteration and similarly a linear combination $\vec{\Omega}^{(n-1)} = \Sigma_{\beta=1}^{N_0-(n-2)} \Lambda_{(\beta)}^{(n-1)} \vec{\Omega}^{[\beta]}$ of the sets of amplitudes $\vec{\Omega}^{[\beta]}$, determined in block 706 in the previous iteration for (n−1)-th qubit are computed (i.e., the coefficients $\Lambda_{(\beta)}^{(n)}$ and $\Lambda_{(\beta)}^{(n-1)}$ are determined) such that the condition for non-zero entangling interaction between the n-th and (n−1)-th qubits $(\Sigma_{k=1}^{N_{seg}}\Sigma_{l=1}^{k}\Omega_{k}^{(m)}D_{kl}^{(m,n)}\Omega_{l}^{(n)}=\theta^{(m,n)})$ is satisfied and the intensities of the resulting n-th and (n−1)-th pulses averaged over the gate duration $\tau$, $\Sigma_{k=1}^{N_{seg}}|\vec{\Omega}_{k}^{(n)}|^2$ and $\Sigma_{k=1}^{N_{seg}}|\vec{\Omega}_{k}^{(n-1)}|^2$ are minimized. The n-th and (n−1)-th pulses described above are configured to be power-optimal (i.e., the required laser power is minimized). The process returns to block 704 for determining amplitude $\Omega^{(n+1)}$ of a (n+1)-th pulse to be applied to (n+1)-th qubit.

In block 712, a linear combination $\vec{\Omega}^{(n)}=\Sigma_{\beta=1}^{N_0-(n-1)} \Lambda_{(\beta)}^{(n)}\vec{\Omega}^{[\beta]}$ of the sets of amplitudes $\vec{\Omega}^{[\beta]}$, determined in block 706 is computed (i.e., the coefficients $\Lambda_{(\beta)}^{(n)}$ are determined) such that the conditions for non-zero entangling interaction and decoupling between the n-th and m-th qubits (m=1, 2, ..., n−1) $(\Sigma_{k=1}^{N_{seg}}\Sigma_{l=1}^{k}\Omega_{k}^{(m)}D_{kl}^{(m,n)}\Omega_{l}^{(n)}=\theta^{(m,n)}$, if the n-th and m-th qubits are to be entangled, or 0 otherwise) and the intensity of the resulting n-th pulse averaged over the gate duration $\tau$, $\Sigma_{k=1}^{N_{seg}}|\vec{\Omega}_{k}^{(n)}|^2$, is minimized. The n-th and (n−1)-th pulses described above are configured to be power-optimal (i.e., the required laser power is minimized). The process returns to block 704 for determining amplitude $\Omega^{(n+1)}$ of a (n+1)-th pulse to be applied to (n+1)-th qubit.

The process ends when pulses for all the $N_{EASE}$ participating qubits are constructed.

The application of the constructed pulses as described above to the participating qubits implements entangling gate operations (XX gate operations) on pairs within the participating qubits among the series of universal gate {R, XX} operations into which a selected quantum algorithm is decomposed. All of the XX-gate operations (XX gates) in the series of universal gate {R, XX} operations are implemented by the method 700 described above, along with single-qubit operations (R gates), to run the selected quantum algorithm, which is defined and implemented by the classical computer. At the end of running the selected quantum algorithm, population of the qubit states (trapped ions) within the quantum register (the chain 102 of trapped ions) is determined (read-out) by measurements obtained by the imaging objective 104 and mapped onto the PMT 106, so that the results of the quantum computation(s) within the selected quantum algorithm can be determined and provided as input to the classical computer (e.g., digital computer). The results of the quantum computation(s) can then be processed by the classical computer to perform a desired activity or obtain solutions to problems that are typically not ascertainable, or ascertainable in a reasonable amount of time, by the classical computer alone. The problems that are known to be intractable or unascertainable by the conventional computers (i.e., classical computers) today and may be solved by use of the results obtained from the performed quantum computations may include, but are not limited to simulating internal chemical structures of complex molecules and materials, and factoring a large integer.

Because the above detailed method to implement EASE gates is completely linear, the EASE protocol can be used for any linear approaches that solve for the pulses that implement XX gates. For example, the linear, power-optimal pulse construction method described in the U.S. Provisional Application No. 62/851,280 (entitled "Amplitude, Frequency, And Phase Modulated Entangling Gates For Trapped-Ion Quantum Computers"), which is incorporated by reference herein, can be used according to the EASE protocol to result in a simultaneous amplitude- and frequency-modulated pulses that implement plurality of XX gates simultaneously, which may be compared with the amplitude modulation methods used and described above.

The EASE protocol described herein can determine pulses to perform simultaneous entangling gate operations on multiple pairs of qubits without errors or approximations in an efficient manner. That is, overhead for determining the pulses, such as a number of time segments, only increases linearly with respect to the number of participating qubits. This is contrast to previously-proposed non-linear and approximate methods that require overhead that increases exponentially as the number of participating qubits increases. Furthermore, the pulses constructed by the EASE protocol are optimal when used for a single XX gate operation in that the required laser power to perform gate operations is minimum in the case the amplitude modulation is used to achieve the desired entanglement. Therefore, a quantum computer can be scaled up to a larger size at a faster execution speed, with given available resources, such as laser powers to implement the pulse or computational resources to determine pulses.

While the foregoing is directed to specific embodiments, other and further embodiments may be devised without departing from the basic scope thereof, and the scope thereof is determined by the claims that follow.

The invention claimed is:

1. A method of performing simultaneous entangling gate operations in a trapped-ion quantum computer, comprising:
   executing, by a processor in a digital computer, a software program that is stored in non-volatile memory of the digital computer, wherein the executed software program requires at least one computation to be performed, the at least one computation comprising:
   selecting a gate duration value and a detuning frequency of pulses to be individually applied to a plurality of participating ions in a chain of trapped ions to simultaneously entangle a plurality of pairs of ions among the plurality of participating ions by one or more predetermined values of entanglement interaction, wherein
   each of the trapped ions in the chain has two frequency-separated states defining a qubit, and
   motional modes of the chain of trapped ions each have a distinct frequency;
   determining amplitudes of the pulses, based on the selected gate duration value, the selected detuning frequency, and the frequencies of the motional modes of the chain of trapped ions;
   generating the pulses having the determined amplitudes; and
   applying the generated pulses to the plurality of participating ions for the selected gate duration value;
   measuring population of qubit states of the ions in the chain of trapped ions, wherein the at least one computation further comprises:
   processing quantum information corresponding to the qubit states of ions in the chain of trapped ions by the processor of the digital computer based on the measured population of the qubit states; and
   generating a solution to a selected quantum algorithm based on the processed results of the quantum computations.

2. The method according to claim 1, wherein the amplitudes are selected based on a condition where the trapped ions in the chain of trapped ions substantially return to their original positions and momentum values.

3. The method according to claim 2, wherein the amplitudes are selected based on conditions where there is non-zero entanglement interaction between each of the plurality of pairs of ions that are to be entangled, and each pair of ions that are not to be entangled is decoupled.

4. The method according to claim 3, wherein the one or more predetermined values of entanglement interaction are between zero and $\pi/2$.

5. The method according to claim 4, wherein the amplitudes are selected based on a condition where power to be provided to the plurality of participating ions during the selected gate duration value is at a minimum.

6. The method according to claim 1, wherein the amplitudes are selected based on conditions where there is non-zero entanglement interaction between each of the plurality of pairs of ions that are to be entangled, and each pair of ions that are not to be entangled is decoupled.

7. The method according to claim 6, wherein the one or more predetermined values of entanglement interaction are between zero and $\pi/2$.

8. The method according to claim 6, wherein the amplitudes are selected based on a condition where power to be provided to the plurality of participating ions during the selected gate duration value is at a minimum.

9. The method according to claim 1, wherein determining the amplitudes comprises dividing the gate duration value into a plurality of time segments.

10. The method according to claim 1,
wherein the at least one computation further comprises:
selecting the quantum algorithm to be implemented on the chain of trapped ions;
compiling the selected quantum algorithm into a series of universal logic gates; and
translating the series of universal logic gates into pulses to apply to a plurality of participating ions in the chain of trapped ions.

11. A quantum computing system, comprising:
a chain of trapped ions, each of the trapped ions having two hyperfine states defining a qubit and an excited state;
one or more lasers configured to emit a laser beam that is split into two or more non-copropagating laser beams which are provided to each of the trapped ions, wherein the two or more non-copropagating laser beams are configured to cause Rabi flopping of each of the trapped ions between the two hyperfine states via the excited state; and
a controller comprising non-volatile memory having a number of instructions stored therein which, when executed by a processor of a digital computer, causes the quantum computing system to perform operations comprising:
select a gate duration value and a detuning frequency of one or more pulses to be individually applied to a plurality of participating ions in a chain of trapped ions to simultaneously entangle a plurality of pairs of ions among the plurality of participating ions by one or more predetermined values of entanglement interaction, wherein
each of the trapped ions has two frequency-separated states defining a qubit,
motional modes of the chain of trapped ions each have a distinct frequency, and
one of the plurality of pairs of ions comprises a first ion and a second ion;
determine amplitudes of the pulses, based on the selected gate duration value, the selected detuning frequency, and the frequencies of the motional modes of the chain of trapped ions, wherein the amplitudes are derived based on conditions for non-zero entanglement interaction between each of the plurality of pairs of ions that are to be entangled, decoupling between each pair of ions that are not to be entangled, and minimized power provided to the plurality of participating ions during the selected gate duration value;
generate the pulse comprising the determined amplitude and the detuning frequency;
apply the generated pulse to the first and second ions for the gate duration value;
measure population of qubit states of the ions in the chain of trapped ions;
process quantum information corresponding to the qubit states of ions in the chain of trapped ions by the processor of the digital computer based on the measured population of the qubit states; and
generate a solution to a selected quantum algorithm based on the processed results of the quantum computations.

12. The quantum computing system according to claim 11, wherein
each of the trapped ions is $^{171}$Yb+ having the $^2S_{1/2}$ hyperfine states, and
the laser is a mode-locked laser at 355 nm.

13. The quantum computing system according to claim 11, wherein the amplitudes are selected based on a condition where the trapped ions in the chain of trapped ions substantially return to their original positions and momentum values.

14. The quantum computing system according to claim 13, wherein the amplitudes are selected based on conditions where there is non-zero entanglement interaction between each of the plurality of pairs of ions that are to be entangled, and each pair of ions that are not to be entangled is decoupled.

15. The quantum computing system according to claim 14, wherein the one or more predetermined values of entanglement interaction are between zero and $\pi/2$.

16. The quantum computing system according to claim 15, wherein the amplitudes are selected based on a condition where the power to be provided to the plurality of participating ions during the selected gate duration value is at a minimum.

17. The quantum computing system according to claim 11, wherein the amplitudes are selected based on conditions where there is non-zero entanglement interaction between each of the plurality of pairs of ions that are to be entangled, and each pair of ions that are not to be entangled is decoupled.

18. The quantum computing system according to claim 17, wherein the one or more predetermined values of entanglement interaction are between zero and $\pi/2$.

19. The quantum computing system according to claim 18, wherein the amplitudes are selected based on a condition where the power to be provided to the plurality of participating ions during the selected gate duration value is at a minimum.

20. The quantum computing system according to claim 11, wherein determining the amplitudes comprises dividing the gate duration value into a plurality of time segments.

* * * * *